US012144323B2

(12) United States Patent
Heatwole

(10) Patent No.: US 12,144,323 B2
(45) Date of Patent: *Nov. 19, 2024

(54) LITTER CONDITIONER AND METHOD OF USING THE SAME

(71) Applicant: Global Nutrient Conditioning LLC, New Market, VA (US)

(72) Inventor: Corwin Brent Heatwole, Rockingham, VA (US)

(73) Assignee: Global Nutrient Conditioning LLC, Broadway, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,386

(22) Filed: Jul. 20, 2022

(65) Prior Publication Data

US 2022/0354093 A1 Nov. 10, 2022

Related U.S. Application Data

(63) Continuation of application No. 17/216,120, filed on Mar. 29, 2021, now Pat. No. 11,399,514, which is a
(Continued)

(51) Int. Cl.
*A01K 31/04* (2006.01)
(52) U.S. Cl.
CPC .................................. *A01K 31/04* (2013.01)
(58) Field of Classification Search
CPC ........ A01K 1/01; A01K 1/011; A01K 1/0107; A01K 1/0114; A01K 1/0128; A01K 1/0132; A01K 31/005; A01K 31/04; F23G 7/14
(Continued)

(56) References Cited

U.S. PATENT DOCUMENTS 3,599,785 A 8/1971 Stuart et al.
3,845,516 A 11/1974 Abbott et al.
(Continued)

FOREIGN PATENT DOCUMENTS

CN 106718973 A 5/2017
CN 107087547 A 8/2017
WO WO-2019053141 A1 3/2019

OTHER PUBLICATIONS

International Preliminary Report on Patentability for International Application No. PCT/US2020/066670, mailed Jul. 7, 2022, 9 pages.
(Continued)

*Primary Examiner* — Peter M Poon
*Assistant Examiner* — Danielle A Clerkley
(74) *Attorney, Agent, or Firm* — COOLEY LLP

(57) ABSTRACT

An at least semi-autonomous litter conditioning vehicle has a chassis. A drive system is coupled to the chassis and can move the vehicle along a floor of an animal enclosure. A collection system is coupled to a front portion of the chassis and includes a flailer that can reduce a particle size of the litter as the collection system collects litter from the floor. A conditioning system is coupled along a length of the chassis and includes a drum that can receive the collected litter and can be rotated to tumble the litter. A heating element of the conditioning system can transfer thermal energy to the litter as it is tumbled in the drum. A dispersement system is coupled to a back portion of the chassis. The dispersement system can receive conditioned litter from the conditioning system and can disperse the conditioned litter on the floor behind the vehicle.

17 Claims, 21 Drawing Sheets

Related U.S. Application Data continuation of application No. PCT/US2020/066670, filed on Dec. 22, 2020.

(60) Provisional application No. 62/952,818, filed on Dec. 23, 2019.

(58) Field of Classification Search
USPC ............ 119/416, 432, 1, 442, 447, 458, 166
See application file for complete search history.

(56) References Cited

U.S. PATENT DOCUMENTS

| | | | |
|---|---|---|---|
| 4,619,412 A | 10/1986 | Willingham | |
| 4,854,507 A | 8/1989 | Smith | |
| 4,974,528 A | 12/1990 | Barcell | |
| 5,078,328 A | 1/1992 | Willingham | |
| 5,143,309 A | 9/1992 | Endom | |
| 5,540,004 A | 7/1996 | Patterson et al. | |
| 5,732,892 A | 3/1998 | Neier | |
| 5,749,114 A | 5/1998 | Miller, Jr. et al. | |
| 6,017,525 A | 1/2000 | Logan et al. | |
| 6,467,432 B1 | 10/2002 | Lewis et al. | |
| 6,820,358 B1 | 11/2004 | Huelsewiesche | |
| 7,028,932 B2 | 4/2006 | Lucas et al. | |
| 7,341,014 B2 | 3/2008 | Smith | |
| 7,341,024 B2 | 3/2008 | Wood | |
| 7,552,827 B2 | 6/2009 | Menke et al. | |
| 7,628,346 B1 | 12/2009 | Darden | |
| 8,626,441 B2 | 1/2014 | Matthews | |
| 8,694,382 B2 | 4/2014 | Aznavorian et al. | |
| 8,740,117 B1 | 6/2014 | Zimmerman | |
| 8,915,458 B2 | 12/2014 | Bender | |
| 8,919,289 B2 | 12/2014 | O'Connor | |
| 9,332,736 B2 | 5/2016 | Underwood | |
| 9,377,788 B2 | 6/2016 | Pivonka | |
| 9,454,153 B2 | 9/2016 | Sights et al. | |
| 9,615,497 B2 | 4/2017 | Bassett et al. | |
| 9,964,951 B1 | 5/2018 | Dunn et al. | |
| 10,077,984 B2 | 9/2018 | Akselrod et al. | |
| 10,104,822 B2 | 10/2018 | Couchman | |
| 10,188,024 B2 | 1/2019 | Rusciolelli et al. | |
| 10,378,906 B2 | 8/2019 | O'Brien et al. | |
| 10,384,678 B1 | 8/2019 | Konrardy et al. | |
| 10,399,045 B2 | 9/2019 | Altomare | |
| 10,626,059 B2 | 4/2020 | Townsend | |
| 11,399,514 B2 | 8/2022 | Heatwole | |
| 2003/0070461 A1 | 4/2003 | Ferguson | |
| 2004/0168651 A1 | 9/2004 | Wood | |
| 2004/0200428 A1 | 10/2004 | Wood | |
| 2005/0217332 A1 | 10/2005 | Keller et al. | |
| 2007/0245512 A1* | 10/2007 | Mensch | B08B 5/04 15/340.1 |
| 2009/0031616 A1 | 2/2009 | Agblevor | |
| 2010/0212262 A1 | 8/2010 | Townsend | |
| 2010/0308140 A1 | 12/2010 | Darden | |
| 2012/0168545 A1 | 7/2012 | Bender | |
| 2013/0298842 A1 | 11/2013 | Underwood | |
| 2015/0348419 A1 | 12/2015 | Matthews | |
| 2017/0293305 A1 | 10/2017 | Altomare | |
| 2018/0111274 A1 | 4/2018 | Seok et al. | |
| 2018/0210460 A1 | 7/2018 | Rowley et al. | |
| 2018/0217614 A1 | 8/2018 | Salas-Moreno et al. | |

OTHER PUBLICATIONS

International Search Report and Written Opinion of the International Searching Authority for International Application No. PCT/US2020/066670 dated Mar. 17, 2021, 10 pages.

Office Action and Search Report for Chinese Application No. 202080096895.7 dated May 31, 2023, 23 pages.

Extended European Search Report for European Application No. 20904874.3 dated Dec. 12, 2023, 11 pages.

* cited by examiner

LITTER CONDITIONER AND METHOD OF USING THE SAME

CROSS-REFERENCE TO RELATED APPLICATIONS

This application is a continuation of U.S. patent application Ser. No. 17/216,120, filed Mar. 29, 2021, entitled "Litter Conditioner and Method of Using the Same," which is a continuation of International Patent Application Serial No. PCT/US2020/066670, filed Dec. 22, 2020, entitled "Litter Conditioner and Method of Using the Same," which claims priority to and the benefit of U.S. Provisional Patent Application Ser. No. 62/952,818, filed Dec. 23, 2019, entitled "Litter Conditioner," the disclosure of each of which is incorporated herein by reference in its entirety.

BACKGROUND

Embodiments described herein relate to conditioning and/or treating litter and, more particularly, to an at least semi-autonomous machine configured to condition poultry litter.

Conditioning and/or treating litter is a known challenge in poultry farming. Poultry litter consists of bedding material (shavings, rice hulls, etc.), manure, feathers, and other components. In some instances, keeping litter dry can help control ammonia levels, can reduce injury to the feet and/or breast of poultry, and can provide a healthier environment for the poultry as well as humans working in the poultry houses. Litter conditions influence the health and performance of the flock, which in turn affects profits of growers.

In general, litter clumps and/or cakes as it begins to retain moisture. Moisture in the litter can be from manure as well as excess humidity in the poultry house (e.g., as a result of inadequate ventilation). Moreover, the ability to absorb additional moisture decreases as the litter begins to clump and cake, which in turn, can result in increases in ammonia level (associated with poultry manure). While adequate ventilation can mitigate these effects, ventilation costs can be prohibitive. Alternatively, litter can be conditioned via manual or semi-manual processes, but such processes can be time consuming, labor intensive, and/or harmful to the humans performing the work.

Accordingly, a need exists for improved systems and methods of conditioning poultry litter.

SUMMARY

In some embodiments, an at least semi-autonomous litter conditioning vehicle can include a chassis. A drive system is coupled to the chassis and is configured to move the litter conditioning vehicle along a floor of an animal enclosure. A collection system is coupled to a front portion of the chassis and is configured to collect litter from the floor. The collection system includes a flailer configured to reduce a particle size of the litter. A conditioning system is coupled along a length of the chassis. The conditioning system includes a drum with an inner volume that can receive litter from the collection system. The drum is configured to rotate to tumble the litter disposed in the inner volume. A heating element of the conditioning system is configured to transfer thermal energy to the litter as the litter is tumbled in the drum. A dispersement system is coupled to a back portion of the chassis and is configured to receive conditioned litter from the conditioning system and to disperse the conditioned litter on the floor behind the litter conditioning vehicle.

DETAILED DESCRIPTION

Figure 1:
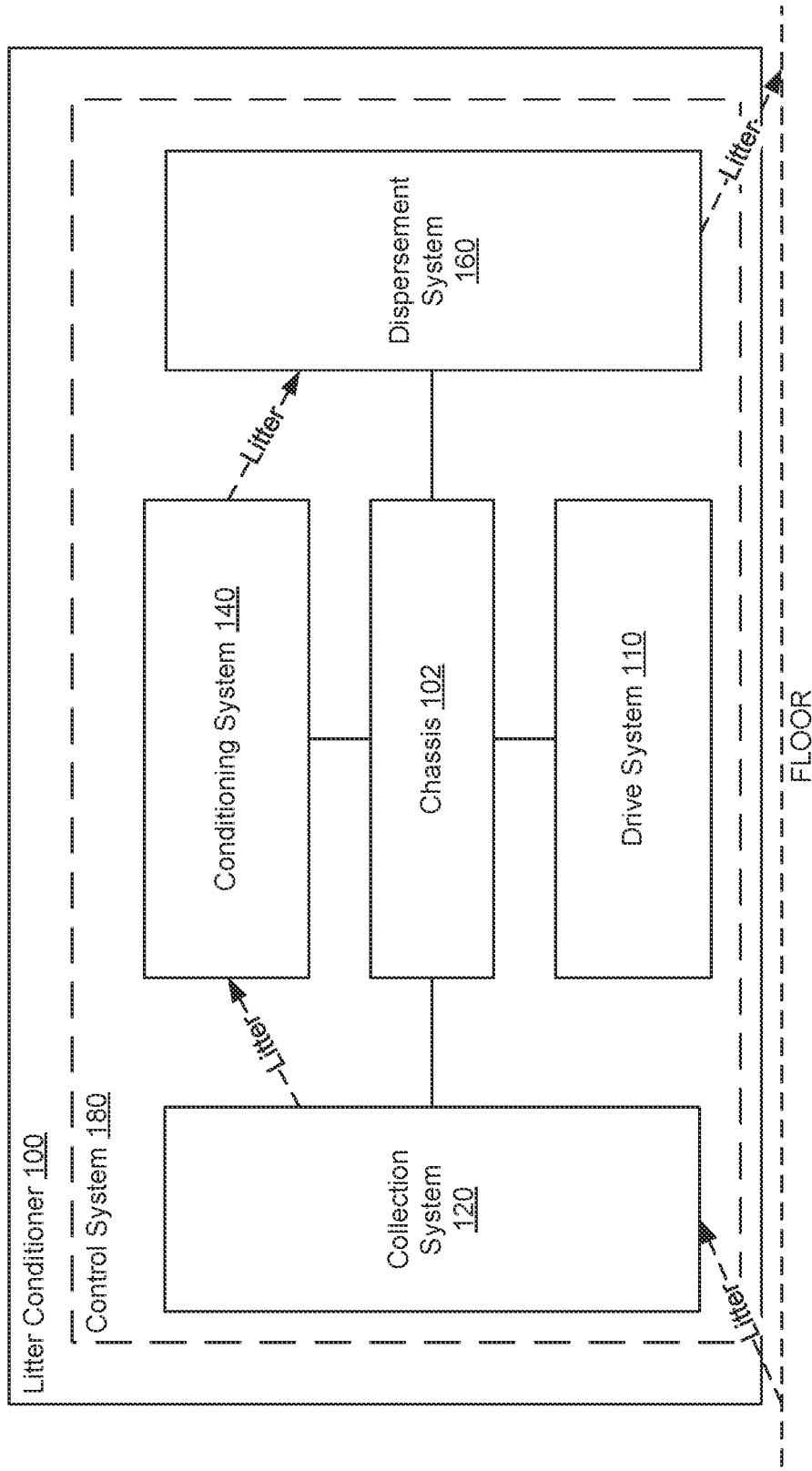
FIG. 1 is a schematic illustration of an at least semi-autonomous litter conditioner according to an embodiment.

Embodiments and/or implementations described herein relate to at least semi-autonomous litter conditioners (e.g., machines, robots, vehicles, etc.) that can condition, treat, and/or refresh poultry litter and/or other animal manures and/or beddings inside a poultry house and/or other animal enclosure used for animal confinement and/or production. In general, animal litter, and poultry litter in particular, clumps and/or cakes as it begins to retain moisture, resulting in a need to condition and/or replace the litter after a given time. Embodiments and/or implementations described herein can condition, treat, and/or refresh litter via, for example, heat treatment and/or the like in one or more autonomous or semi-autonomous processes while inside a poultry house and/or other animal enclosure without damage to the enclosure and/or harm to the animals enclosed therein. A wide variety of potential embodiments of litter conditioners will be more readily understood through the following detailed description with reference to certain embodiments and/or the accompanying drawings.

In some embodiments, an at least semi-autonomous litter conditioning vehicle includes a chassis. A drive system is coupled to the chassis and is configured to move the litter conditioning vehicle along a floor of an animal enclosure. a collection system is coupled to a front portion of the chassis and is configured to collect litter from the floor. The collection system includes a flailer configured to reduce a particle size of the litter. A conditioning system is coupled along a length of the chassis. The conditioning system includes a drum with an inner volume that can receive litter from the collection system. The drum is configured to rotate to tumble the litter disposed in the inner volume. A heating element of the conditioning system is configured to transfer thermal energy to the litter as the litter is tumbled in the drum. As dispersement system is coupled to a back portion of the chassis and is configured to receive conditioned litter from the conditioning system and to disperse the conditioned litter on the floor behind the litter conditioning vehicle.

In some embodiments, an at least semi-autonomous litter conditioning vehicle includes a chassis. A collection system is coupled to a front portion of the chassis and is configured to collect litter from a floor of an animal enclosure as the litter conditioning vehicle moves along the floor. The collection system includes a flailer configured to reduce a particle size of the litter to a first average particle size. A conditioning system is coupled along a length of the chassis and includes an infeed mechanism, a drum, and a heating element. The infeed mechanism is configured to (i) receive the litter having the first average particle size, (ii) reduce a particle size of the litter from the first average particle size to a second average particle size, and (iii) provide at least a portion of the litter having the second average particle size into an inner volume of the drum. The drum is configured to rotate to tumble the litter disposed in the inner volume. The heating element is configured to transfer thermal energy to the litter as the litter is tumbled in the drum. A dispersement system is coupled to a back portion of the chassis and is configured to receive conditioned litter from the conditioning system and to disperse the conditioned litter on the floor behind the litter conditioning vehicle.

In some implementations, a method of using an at least semi-autonomous litter conditioning vehicle includes collecting litter from a floor of an animal enclosure as the litter conditioning vehicle moves along the floor. An average particle size of the collected litter is reduced, and the litter is provided into an inner volume of a drum included in a conditioning system of the litter conditioning vehicle. The drum is rotated to tumble the litter disposed in an inner volume of the drum and thermal energy is transferred from a heating element to the litter as the litter is tumbled in the inner volume of the drum. After a predetermined dwell time in the drum, conditioned litter is provided to a dispersement system. The dispersement system is configured to disperse the conditioned litter on a portion of the floor substantially behind the litter conditioning vehicle.

In some embodiments, a rolling litter conditioner can be configured to heat treat litter within a poultry barn to a temperature sufficient to eliminate at least 90 percent of pathogens from the litter. The poultry barn can have a ceiling that is 96 inches from a floor of the poultry barn or less. The litter conditioner includes a heating system configured to heat the litter to a desired average temperature (e.g., an average temperature of at least 170 degrees Fahrenheit (° F.)), a collection system configured to remove litter from the floor and deliver litter to the heating system, and/or a dispersement system configured to receive litter from the heating system and to return litter to the floor. In some implementations, the litter conditioner is configured to be at least one of pulled by a separate vehicle, self-propelled, remotely controlled, and/or autonomously controlled.

The terminology used herein is for the purpose of describing particular embodiments only and is not intended to limit the full scope of the claims. Unless defined otherwise, all technical and scientific terms used herein have the same meanings as commonly understood by one of ordinary skill in the art.

As used in this specification, the singular forms "a," "an," and "the" include plural referents unless the context clearly dictates otherwise. For example, the term "a member" is intended to mean a single member or a combination of members, "a material" is intended to mean one or more materials, or a combination thereof. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims, are generally intended as "open" terms (e.g., the term "including" should be interpreted as "including but not limited to," the term "having" should be interpreted as "having at least," etc.). Similarly, the terms "comprises" and/or "comprising," when used in this specification, specify the presence of stated features, integers (or fractions thereof), steps, operations, elements, and/or components, but do not preclude the presence or addition of one or more other features, integers (or fractions thereof), steps, operations, elements, components, and/or groups thereof. As used in this document, the term "comprising" means "including, but not limited to."

As used herein the term "and/or" includes any and all combinations of one or more of the associated listed items. It should be understood that any suitable disjunctive word and/or phrase presenting two or more alternative terms, whether in the description, claims, or drawings, contemplate the possibilities of including one of the terms, either of the terms, or both terms. For example, the phrase "A or B" will be understood to include the possibilities of "A" or "B" or "A and B."

All ranges disclosed herein are intended to encompass any and all possible subranges and combinations of subranges thereof unless expressly stated otherwise. Any listed range should be recognized as sufficiently describing and enabling the same range being broken down into at least equal subparts unless expressly stated otherwise. As will be understood by one skilled in the art, a range includes each individual member and/or a fraction of an individual member where appropriate.

As used herein, the terms "about," "approximately," and/or "substantially" when used in connection with stated value(s) and/or geometric structure(s) or relationship(s) is intended to convey that the value or characteristic so defined is nominally the value stated or characteristic described. In some instances, the terms "about," "approximately," and/or "substantially" can generally mean and/or can generally contemplate a value or characteristic stated within a desirable tolerance (e.g., plus or minus 10% of the value or characteristic stated). For example, a value of about 0.01 can include 0.009 and 0.011, a value of about 0.5 can include 0.45 and 0.55, a value of about 10 can include 9 to 11, and a value of about 100 can include 90 to 110. Similarly, a first surface may be described as being substantially parallel to a second surface when the surfaces are nominally parallel.

While a value, structure, and/or relationship stated may be desirable, it should be understood that some variance may occur as a result of, for example, manufacturing tolerances or other practical considerations (such as, for example, the pressure or force applied through a portion of a device, conduit, lumen, etc.). Accordingly, the terms "about," "approximately," and/or "substantially" can be used herein to account for such tolerances and/or considerations.

As used herein, the term "set" can refer to multiple features or a singular feature with multiple parts. For example, when referring to a set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. A set of walls can also be fabricated from multiple items that are produced separately and are later joined together (e.g., via a weld, an adhesive, or any suitable method).

Embodiments described herein relate to systems and/or machines for conditioning litter, and more particularly, poultry litter. As used herein, the term "poultry" generally refers to domesticated fowl, especially those valued for their meat and/or eggs, such as, for example, chickens, turkeys, ducks, geese, and/or the like. The term "litter" generally refers to poultry excreta, feed, feathers, dust, sand, soil, and/or bedding materials, such as wood shavings, sawdust, peanut hulls, rice hulls, shredded sugar cane, straw, and/or other relatively dry, absorbent, and/or low-cost organic materials.

Any of the embodiments, devices, and/or machines described herein can be at least semi-automatic and/or at least semi-autonomous systems. As used herein, the term "automatic" can refer to a machine (e.g., hardware, software, and/or combinations thereof) performing functions, processes, tasks, etc., essentially independent of influence and/or control by a user. For example, an automatic switch can be triggered or "switched" in response to a predetermined and/or anticipated input (e.g., a light switch automatically turning on a light in response to motion within a field of view without a person manually operating the light switch).

Similarly, the term "autonomous" generally refers to a machine (e.g., hardware, software, and/or combinations thereof) capable of sensing its environment and/or otherwise operating in response to any given inputs without human input. In this context, autonomy can be referred to in terms of degrees or levels thereof. For example, a "semi-autonomous" machine can be configured to perform predefined operations and/or processes based on predetermined inputs. By way of example, a machine such as any of the litter conditioners described herein can be "self-driving" or otherwise configured to steer or move the machine without human intervention based on any number of inputs or results of analyses such as analyses of an image received from a camera, position, velocity, and/or acceleration data. As another example, a machine such as any of the litter conditioners described herein can be fully autonomous configured to perform all or substantially all of its desired tasks without human intervention. Such a machine can include any number of sensors, encoders, cameras, and/or any other data capture devices configured to capture data associated with a function or state of at least a portion of the machine, which can be analyzed to determine one or more future actions that the machine will perform.

The embodiments described herein can include any suitable feedback control devices, mechanism, schemes, and/or the like configured to allow a machine and/or a portion of the machine to operate at least semi-autonomously. As used herein, the terms "feedback," "feedback system," and/or "feedback loop" relate to a system wherein past or present characteristics influence current or future actions. For example, a thermostat is said to be a feedback system wherein the state of the thermostat (e.g., in an "on" configuration or an "off" configuration) is dependent on a temperature being fed back to the thermostat. Feedback systems can include a control scheme such as, for example, a proportional-integral-derivative (PID) controller. Expanding further, an output of some feedback systems can be described mathematically by the sum of a proportional term, an integral term, and a derivative term. PID controllers are often implemented in one or more electronic devices. In such controllers, the proportional term, the integral term, and/or the derivative term can be actively "tuned" to alter characteristics of the feedback system.

Electronic devices often implement feedback systems to actively control the kinematics of a machine in order to achieve and/or maintain a desired system state. For example, a feedback system can be implemented to control a force within a system (e.g., a mass-spring system and/or the like) by changing the kinematics and/or the position of one or more components relative to any other components included in the system. In some implementations, an electronic device implementing a feedback system can determine current and/or past states (e.g., position, velocity, acceleration, force, torque, tension, electrical power, etc.) of one or more components included in the machine and return the past and/or current state values to, for example, a PID control scheme. In some instances, an electronic device can implement any suitable numerical method or any combination thereof (e.g., Newton's method, Gaussian elimination, Euler's method, LU decomposition, etc.). Thus, based on the past and/or current state of the one or more components, an electronic device and/or controller can actively monitor, change, and/or update one or more portions of the machine to a desired system state.

FIG. 1 is a schematic illustration of a litter conditioning vehicle 100 according to an embodiment. The litter conditioning vehicle 100 (also referred to herein as "litter conditioner" or "vehicle") can be any suitable shape, size, and/or configuration that enables the vehicle 100 to operate within an animal house, facility, and/or enclosure. For example, the vehicle 100 can be configured to operate within the poultry house and/or the like. In other implementations, however, the vehicle 100 can be used in any suitable indoor or outdoor environment where it is desirable to condition litter contained therein.

In certain embodiments, the litter conditioner 100 can be configured to maintain a desired maximum operating height that provides a desired gap between the top of the litter conditioner 100 and the bottom of the roof of the poultry house, which are often constructed from a relatively easily combustible and/or meltable plastic material, (e.g., from 12 inches to 96 inches, including all values and subranges therebetween, such as, for example, 78 inches) and/or can be able to be raised for transport mode and/or lowered for operating mode. In some embodiments, the conditioner can have a height greater than 96 inches. The raising and/or lowering can be controlled by, for example, arms that can be hydraulically adjusted (other methods could be used such as direct hydraulics, an arm system, an air bag system, and/or the like).

As shown in FIG. 1, the litter conditioner 100 includes a chassis 102, a drive system 110, a collection system 120, a conditioning system 140, and a dispersement system 160. The litter conditioner 100 also may optionally include a control system 180. The chassis 102 can be any suitable structure configured to support one or more portions of the litter conditioner 100. The chassis 102 can include, for example, beams, rods, tubes, etc. formed from any suitable material such as steel, aluminum, and/or alloys thereof. The chassis 102 can be any suitable shape and/or size based at least in part on the components and/or systems included in the litter conditioner 100. In some implementations, the chassis 102 can be relatively low profile such that a height of the litter conditioner 100 is maintained below a predetermined height (e.g., a clearance height associated with animal enclosures and specifically, poultry houses).

The drive system 110 is coupled to the chassis 102 and is configured to move the litter conditioner 100 along a floor (e.g., a floor of an animal enclosure). The drive system 110 can include any suitable component, machine, device, and/or the like. In some implementations, for example, the drive system 110 can include a set of wheels (e.g., two wheels, three wheels, four wheels, five wheels, or more) that can be connected to a power source. For example, the set of wheels (or at least a portion thereof) can be mechanically connected to an internal combustion engine or the like via any suitable transmission, drive shaft, and/or mechanical linkage. In some implementations, the set of wheels (or at least a portion thereof) can include a set of electrical motors that are electrically connected to a power source such as a battery assembly, generator, and/or the like. In some implementations, each wheel in the set of wheels can include an electric motor that can control a rotation of the corresponding wheel, allowing for independent control of each wheel. In other embodiments, the drive system 110 need not be powered by an engine or motor. In such embodiments, for example, the litter conditioner 100 can be at least temporarily coupled (e.g., via a mechanical linkage) to a tractor and/or other suitable vehicle, which in turn, can be operated to tow the litter conditioner 100. Although described as including a set of wheels, in other embodiments, the drive system 110 can include, for example, a set of tracks—tank-like tracks—and/or any other mechanism for moving the litter conditioner 100 along the floor.

The collection system 120 is coupled to the chassis 102 and is configured to collect litter from the floor as the drive system 110 moves the litter conditioner 100 along the floor. In some embodiments, the collection system 120 can be coupled to a front portion of the chassis 102 and can be disposed, for example, in front of a front set of wheels of the drive system 110. In some implementations, this arrangement can allow the collection system (or at least a portion thereof) to be raised or lowered to contact the floor from which the litter is collected. In other embodiments, the collection system 120 and/or at least a portion of thereof can be coupled to the chassis 102 and disposed, at least in part, behind the front set of wheels of the drive system 110.

The collection system 120 can include any suitable component, machine, device, motor, and/or the like that can aid in and/or otherwise facilitate the collection and transport of litter from the floor. In some implementations, the collection system 120 can include a scoop, shovel, auger, flailer, etc. For example, a scoop or the like can be moved along the floor to lift, scoop, pry, and/or otherwise collect the litter from the floor. In some implementations, such a scoop can be, for example, a passive collection device that collects litter off the floor without the use of rotating and/or moving components (e.g., driven by a motor or the like).

In some embodiments, the collection system 120 can include an active collection device that collects litter off of the floor using one or more rotating and/or moving components. For example, the collection system 120 can include a flailer (or flailing system) and/or an auger that can be rotated to break apart, lift, and/or toss litter from the floor and into a portion of the collection system 120. In some implementations, the flailer and/or auger can be driven and/or powered (e.g., rotated) by an electric motor and/or the like. In other implementations, the flailer and/or auger can be driven and/or powered by a power unit of the litter conditioner 100 such as, for example, the internal combustion engine and/or power generator used to power the drive system 110. In such implementations, the litter conditioner 100 can include any suitable gearing, transmission, linkage, belt, chain, etc. configured to operably connect an input of the flailer and/or auger to an output of the power unit (e.g., engine). In other implementations, the flailer and/or auger can be driven and/or otherwise rotated in response to contact with the litter and/or floor. For example, the flailer can be placed in contact with a portion of the floor such that motion of the litter conditioner 100 (e.g., via the drive system 110) results in the flailer rolling along the floor (e.g., the flailer is rotated).

In some embodiments, a flailer can include any number of cleats, protrusions, paddles, fins, tines, brushes, and/or the like that can contact the litter disposed on the floor to at least partially break apart the litter and draw or move the litter into a portion of the collection system 120. In some implementations, the flailer can be configured to reduce an average particle size of the litter as the flailer collects the litter. For example, as described above, used litter can be designed to clump and/or cake as the litter retains moisture (e.g., moisture from animal manure and/or any other source). The flailer and/or the cleats, etc. of the flailer can be placed in contact with the litter on the floor and the rotation of the flailer can result in the cleats, etc. breaking apart the litter into chunks and/or particles having a desired average particle size.

In some implementations, the collection system 120 can be configured to direct the collected litter into and/or toward an inner or central portion thereof. For example, the scoop, flailer, auger, and/or the like (or combination thereof) can have a shape and/or configuration that results in the litter being directed to the central portion of the collection system 120 (or at least a central portion of the scoop, flailer, auger, etc.). The collection system 120 can further include a transfer portion that can be configured to transfer the collected litter to, for example, the conditioning system 140. The transfer portion can include one or more conveyers, shoots, channels, tracks, paths, etc. allowing the transfer portion to provide an inflow of litter into the conditioning system 140, as shown in FIG. 1. In some implementations, for example, the transfer portion can include a conveyer with cleats, scoops, etc. to facilitate advancement of the litter along the conveyer. In some embodiments, the transfer portion can include a sloped conveyer having a relatively low first end adjacent to the flailer, auger, scoop, etc., and a relatively high second end adjacent an infeed of the conditioning system 140. In some implementations, the conveyer can be driven via a motor which can be the same motor driving the flailer and/or auger or can be a different motor. In other implementations, the collection system 120 can include a vacuum source, blower, and/or the like used to facilitate the transfer of the litter from the floor to the conditioning system 140.

In some implementations, the collection system 120 can include one or more sensors configured to sense an operating state of at least a portion of the collection system 120. For example, the collection system 120 can include a sensor configured to sense an operating state such as, a power state of a flailer, a power state of a blower or vacuum source, a rotational velocity of the flailer, a position of the flailer or a portion of the collection system 120, and/or the like. In some implementations, the collection system 120 can include an optical sensor, camera, scanner, video recorder, and/or the like configured to capture images of the collected litter, which can be analyzed (e.g., by the control system 180) to determine, for example, an average particle size of the collected litter.

The conditioning system 140 is coupled along a portion of the chassis 102 and is configured to condition the litter collected by the collection system 120. In some embodiments, for example, the conditioning system 140 can be disposed on and/or coupled along the chassis 102 such that a first end portion of the conditioning system 140 is disposed near or adjacent to the collection system 120 and a second end portion of the conditioning system 140 is disposed near or adjacent to the dispersement system 160.

The conditioning system 140 can include any suitable component, machine, device, motor, and/or the like that can aid in and/or otherwise facilitate the conditioning of litter collected by the collection system 120. In some embodiments, for example, the conditioning system 140 can include a drum that defines an inner volume configured to receive litter therein. In some embodiments, the drum can include and/or can be coupled to an infeed mechanism that includes, for example, an infeed hopper that is in communication with each of the collection system 120 and the drum of the conditioning system. In some implementations, the infeed mechanism can include an auger, flailer, and/or the like that can be used to transfer litter from the infeed hopper into an inner volume of the drum. The auger, flailer, and/or the like can also be configured to reduce an average particle size of the litter as the litter is transferred into the drum. In some instances, the auger, flailer, and/or the like can be adjusted and/or otherwise controlled to adjust and/or control an average particle size of the litter being transferred into the drum, a flowrate of the litter being transferred into the drum, and/or the like.

The drum is rotatable either manually (e.g., via a crank or the like) or via a motor, engine, and/or power unit. The drum can include any suitable internal feature, surface, structure, etc. configured to contact the litter disposed therein such that the rotation of the drum tumbles the litter disposed in the inner volume of the drum. In some embodiments, the shape and/or configuration of the internal structure(s) can be such that, as the litter is tumbled, it flows along and/or through the drum from the first end portion (e.g., an inlet or infeed end) to the second end portion (e.g., an outlet or outfeed end).

The conditioning system 140 further includes a heating element disposed in the inner volume of the drum or disposed outside the drum and otherwise configured to transfer thermal energy into the inner volume of the drum. The heating element can be, for example, any suitable element configured to release thermal energy. In some implementations, for example, the heating element can be a burner such as a propane burner. In such implementations, the burner can be capable of producing a desired amount of thermal energy (e.g., between about 1 Million (M) British Thermal Units (BTU) and about 10 M BTU, between about 2 M BTU and about 9 M BTU, between about 3 M BTU and about 8 M BTU, between about 4 M BTU and about 7 M BTU, between about 5 M BTU and about 6 M BTU, or about 6 M BTU). In some embodiments, the conditioning system 140 can include a fuel tank configured to provide a fuel to the burner. For example, in some embodiments, the fuel tank can be a fuel tank configured to contain liquid propane. In some embodiments, the conditioning system 140 can include a vaporizer and/or the like configured to vaporize the liquid propane received from the fuel tank and to deliver the vaporized propane to the burner. In some implementations, including a vaporizer can allow a size of the fuel tank to be reduced while providing sufficient vaporized propane to the burner to achieve the desired thermal energy output. For example, the burner can be configured to consume (e.g., burn) vaporized propane received from the fuel tank, a volumetric flowrate of which is at least partially dependent on a size of the fuel tank. In some implementations, however, including a vaporizer can allow a volumetric flowrate of vaporized propane to the burner to be greater than the volumetric flowrate otherwise resulting from the fuel tank alone. Thus, the size of the fuel tank can be reduced while still providing sufficient fuel to the burner to produce a desired amount of thermal energy output.

In some implementations, the heating element can be configured to heat the litter to an average temperature associated with and/or otherwise resulting in a desired amount of conditioning. In some instances, a desired amount of conditioning can result in and/or can be associated with, for example, conditioned litter having average temperature of about 170° F. In other instances, a desired average temperature of the conditioned litter can be less than or greater than 170° F. In some instances, the desired amount of conditioning can be based on, for example, an amount, magnitude, and/or percentage of reduction in an ammonia level of the litter. For example, poultry manure is known to have relatively high levels of ammonia, which can be at least partially absorbed by the litter and can cause harm to the poultry if the litter is not treated, conditioned, dried, and/or replaced. In some instances, the desired amount of conditioning can be an amount of conditioning sufficient to reduce the ammonia levels in the litter and/or in the air of the animal enclosure below a predetermined threshold (e.g., as established by guidelines, and/or otherwise below which the ammonia levels do not harm the poultry and/or humans in the poultry house). In other instances, the desired amount of conditioning can be based on a percent reduction in the ammonia level (e.g., 10%, 20%, 30%, 40%, 50%, 60%, 70%, 80%, 90%, 99%, and/or 100% reduction). In still other instances, the desired amount of conditioning can be an amount of conditioning sufficient to kill microorganisms, pathogens, and/or the like contained in and/or carried by the litter.

In some implementations, one or more operating states, the rotational velocity of the drum, an angle or tilt of the drum, an infeed flowrate of litter, an amount of thermal energy released by the heating element, and/or the like can be controlled and/or adjusted to increase or decrease a dwell time of the litter as it flows (and is tumbled) from the first end portion to the second end portion of the drum. For example, in some instances, the desired amount of conditioning can be based at least in part on an amount of thermal energy received from the heating element and an amount of time that the litter is exposed to the thermal energy. The configuration of the heating element is such that thermal energy is transferred to the gasses (e.g., air and/or other gasses) in the inner volume of the drum and thus, the amount of conditioning can be based at least in part on the dwell time of the litter in the inner volume of the drum. Moreover, an inverse relationship can exist between the dwell time and the amount of thermal energy released by the heating element. As such, a flowrate of the litter through the drum and/or an amount of thermal energy released by the heating element can be controlled and/or adjusted to result in a desired amount of conditioning of the litter.

In some implementations, the conditioning system 140 can include any number of sensors configured to sense at least one operating condition of the conditioning system 140. Data defined by the sensor(s) can be analyzed by, for example, the control system 180, which in turn, can determine and/or define one or more future states of the conditioning system 140 that will result in the desired amount of conditioning. In some instances, the future state can be the same as the current state (e.g., a steady state that does not call for a change in operating state). In other instances, the future state may be different from the current state and the control system 180 may send to the conditioning system 140 one or more signals indicative of an instruction to change an operating condition of one or more portions of the conditioning system 140, thereby transitioning the conditioning system 140 to the future state. For example, in a first case, an amount of litter having a first ammonia level can be transferred into the drum and conditioned for a first predetermined dwell time and/or at a first predetermined temperature based at least in part on the first ammonia level. In a second case, substantially the same amount of litter having a second ammonia level, less than the first ammonia level, can be transferred into the drum and conditioned for a second predetermined dwell time and/or at a second predetermined temperature, where at least one of the second predetermined dwell time or the second predetermined temperature is less than the first predetermined dwell time or the first predetermined temperature, respectively. As such the control system 180 can control one or more portions of the conditioning system 140 to provide a desired amount of litter conditioning.

The dispersement system 160 is coupled to the chassis 102 at a position near and/or adjacent to an output of the conditioning system 140. For example, in some embodiments, the dispersement system 160 can be coupled to a rear portion of the chassis 102. The dispersement system 160 is configured to receive conditioned litter from the conditioning system 140 and to disperse the conditioned litter on to the floor (e.g., behind the litter conditioner 100). The dispersement system 160 can includes any suitable component, machine, device, motor, and/or the like that can aid in and/or otherwise facilitate the dispersement of the conditioned litter. In some embodiments, for example, the dispersement system 160 can include an exhaust shroud that receive conditioned litter from an output of the drum of the conditioning system 140 and deliver the conditioned litter to, for example, one or more spreaders, dispersers, and/or the like. In some embodiments, the dispersement system 160 can include one or more rotating disk spreaders configured to spread a flow of conditioned litter onto the floor behind the litter conditioner. In other embodiments, the dispersement system 160 can include any suitable spreader, disperser, and/or output.

In some embodiments, the dispersement system 160 can include one or more components configured to reduce an amount of dust included in the conditioned litter. For example, the dispersement system 160 can include a blower and one or more cyclone separators configured to separate dust from the conditioned litter. In some implementations, the dispersement system 160 can include an outlet or exhaust configured to direct the dust toward, for example, the floor beneath the litter conditioner 100, thereby reducing an amount of dust released into the air. In other implementations, the cyclone separators and/or the like can be configured to at least temporarily store the dust, which can be disposed of after a conditioning process (e.g., conditioning all the litter in an animal enclosure).

The control system 180 of the litter conditioner 100 can include any suitable component, device, and/or the like that can at least partially control one or more portions of the litter conditioner 100. In some embodiments, the control system 180 can include one or more sensors, electronic devices (e.g., computers), controllers (e.g., programmable logic device (PLD), programmable logic controller (PLC), etc.), and/or the like. For example, the control system 180 can include one or more electronic devices configured to perform one or more processes included in and/or associated with the at least semi-autonomous control of the litter conditioner 100. The electronic device(s) can be any suitable hardware-based computing device configured to receive, process, define, and/or store data such as, for example, data from one or more sensors, feedback data, data associated with the operating state, parameters, properties, etc. of one or more systems, historical data and/or profiles including instructions, processes, and/or information associated with operating in a given animal enclosure (e.g., poultry house), statistical data associated with conditioning effectiveness, etc. In some instances, the electronic device(s) can receive data associated with a current operating state of one or more systems of the litter conditioner 100. Based on the data, the electronic device(s) can determine and/or define a future operating state of the one or more systems and can send any number of signals, instructions, power, etc. configured to transition the one or more systems from the current operating state to the future operating state (e.g., a new or updated operating state).

Examples of control systems and/or electronic devices and/or components thereof are provided below. While certain devices and/or components are described, it should be understood that they have been presented by way of example only, and not limitation. Any other suitable electronic devices having any other suitable components that are capable of performing the processes, procedures, and/or methods described herein may be used.

The electronic device(s) can be, for example, a mobile electronic device (e.g., a smartphone, a tablet, a laptop, and/or any other mobile or wearable device), a personal computer (PC), a workstation, a server device or a distributed network of server devices, a virtual server or machine, a virtual private server and/or the like that is executed and/or run as an instance or guest on a physical server or group of servers, a user manipulated remote control device, and/or any other suitable device. In some implementations, the electronic device(s) can be configured to provide a graphic and/or digital representation of one or more operating states, results of conditioning, litter characteristics, statistical and/or historical data associated with litter conditioning operations, and/or the like. In some instances, the electronic device(s) can be configured to determine and/or graphically or digitally present one or more plans, one or more simulations, and/or any other suitable data associated with a litter conditioning process and/or operation based on any of the graphically and/or digitally represented data.

The components of the electronic device(s) can be contained within a single housing or machine or can be distributed within and/or between multiple physical machines, virtual machines, and/or any combination thereof. In some embodiments, the control system 180 and the electronic device(s) thereof can be physically included in and/or on the litter conditioner 100. In some embodiments, the control system 180 and/or the electronic device(s) can be stored, run, executed, and/or otherwise implemented in a cloudcomputing environment. In some embodiments, the electronic device(s) can include and/or can be collectively formed by a client device, local controller, and/or the like and a server or host device(s), which can be in communication via one or more networks. In some implementations, the electronic device(s) and/or any of the components thereof can enable and/or allow for active user control of the litter conditioner 100, remote control of the litter conditioner 100, semi-autonomous control of the litter conditioner 100, and/or full or substantially full autonomous control of the litter conditioner 100.

The electronic device(s) included in the control system 180 can include at least a memory, a processor, and a communication interface. The memory, the processor, and the communication interface can be connected and/or electrically coupled (e.g., via a system bus or the like) such that electric and/or electronic signals may be sent between the memory, the processor, and the communication interface. The electronic device(s) can also include and/or can otherwise be operably coupled to a database, user interfaces, input/output (I/O) devices, and/or the like, such as any of those described herein.

In some embodiments, a memory can be, for example, a non-volatile memory, a volatile memory, a register, a relay, a switch, a memory buffer, a magnetic media or tape, a hard disk, a floppy disk, an optical media or disk, a compact disk (CD), a digital versatile disk (DVD), a random access memory (RAM), a read-only memory (ROM), an erasable programmable read-only memory (EPROM), an electrically erasable programmable read-only memory (EEPROM), a flash memory, a raid array, and/or the like, or suitable combinations thereof. In some implementations, the memory can be physically housed and/or contained in or by the electronic device(s) or can be operatively coupled to the electronic device(s) and/or at least the processor thereof. The memory can be, for example, included in and/or distributed across one or more devices such as, for example, server devices, cloud-based computing devices, network computing devices, and/or the like. The memory can be configured to store, for example, one or more software modules and/or code that can include instructions that can cause the processor to perform one or more processes, functions, and/or the like (e.g., processes, functions, etc. associated with controlling and/or operating the litter conditioner 100, and/or the like).

The memory and/or at least a portion thereof can include and/or can be in communication with one or more data storage structures such as, for example, one or more databases and/or the like. A database can be any suitable data storage structure(s) such as, for example, a table, a repository, a relational database, an object-oriented database, an object-relational database, a structured query language (SQL) database, an extensible markup language (XML) database, and/or the like. In some embodiments, the database can be disposed in a housing, rack, and/or other physical structure including at least the memory, the processor, and/or the communication interface. The electronic device(s) can include and/or can be operably coupled to any number of databases. In some implementations, the database can be configured to store data associated with the control and/or operation of a machine such as the litter conditioner 100.

In some embodiments, a processor can be any suitable machine that utilizes hardware, firmware, and/or software to perform, via logic operating on a plurality of logic gates that form particular physical circuits, a given task defined by a set of machine-implementable instructions (e.g., stored in the memory). Examples of a processor configured to run or execute a set of instructions or code can include but are not limited to a hardware-based integrated circuit(s), a general purpose processor, a central processing unit (CPU), an accelerated processing unit (APU), an application specific integrated circuit (ASIC), a network processor, a front end processor, a field programmable gate array (FPGA), a programmable logic array (PLA), a microprocessor, a microcontroller, and/or the like. The processor can be in communication with the memory (and any other component of the electronic device) via any suitable interconnection, system bus, circuit, and/or the like. The processor can include any number of engines, processing units, cores, etc. configured to execute code, instructions, modules, processes, functions, etc. (e.g., stored in the memory) associated with the control and/or operation of a machine such as the litter conditioner 100. The processor can further execute code, instructions, modules, process, functions, etc. (e.g., stored in the memory) associated with sending one or more signals to and/or receiving one or more signals from a remote electronic device such as a mobile device to allow for remote control and/or remote monitoring of the litter conditioner 100.

In some embodiments, a communication interface can be any suitable hardware-based device in communication with the processor and the memory and/or any suitable software stored in the memory and executed by the processor. In some implementations, the communication interface can be configured to communicate with a network and/or any suitable device in communication with the network. The communication interface can include one or more wired and/or wireless interfaces, such as, for example, a network interface card (NIC), universal serial bus (USB) card, and/or any other suitable communication and/or peripheral card or device. For example, in some implementations, the NIC can include, for example, one or more Ethernet interfaces, optical carrier (OC) interfaces, asynchronous transfer mode (ATM) interfaces, one or more wireless radios (e.g., a WiFi® radio, a Bluetooth® radio, Near Field Communication (NFC) radios, etc.), and/or the like. In some implementations, the communication interface can be configured to send data to and/or receive data from (e.g., via one or more networks) any suitable portion or device of the litter conditioner 100, one or more peripheral components, a user or client device (e.g., a smartphone, a tablet, a wearable electronic device, a PC, etc.), a remote control device, and/or the like.

In some implementations, a network can be any type of network(s) such as, for example, a local area network (LAN), a wireless local area network (WLAN), a virtual network such as a virtual local area network (VLAN), a wide area network (WAN), a metropolitan area network (MAN), a worldwide interoperability for microwave access network (WiMAX), a telephone network (such as the Public Switched Telephone Network (PSTN) and/or a Public Land Mobile Network (PLMN)), an intranet, the Internet, an optical fiber (or fiber optic)-based network, a cellular network, and/or any other suitable network. Moreover, the network and/or one or more portions thereof can be implemented as a wired and/or wireless network and/or combinations thereof. For example, the network can include one or more networks of any type such as, for example, a wired or wireless LAN and the Internet.

In some embodiments, a user interface can be a display or screen such as, for example, a cathode ray tube (CRT) monitor, a liquid crystal display (LCD) monitor, a light emitting diode (LED) monitor, and/or the like. In some instances, the display can be a touch sensitive display or the like (e.g., the touch sensitive display of a smartphone, tablet, wearable device, PC, and/or the like). In some instances, the display can provide a user interface for a software application (e.g., a mobile application, a PC application, an internet web browser, and/or the like) that can allow the user to manipulate the electronic device(s). In some implementations, the user interface can include any suitable type of human-machine interface device, human-computer interface device, a batch interface, graphical user interface (GUI), and the like. In some implementations, the user interface can be any other suitable user interface and/or input/output (I/O) device(s) such as, for example, a holographic display, a wearable device such as a contact lens display, an optical head-mounted display, a virtual reality display, an augmented reality display, a mouse, a keyboard, and/or the like, or combinations thereof. Accordingly, the electronic device(s) described herein can receive, process, define, and/or store data associated with the control and/or operation of a machine such the litter conditioner 100. In addition, the electronic device(s) can present (e.g., on the display thereof) qualitative and/or quantitative data associated with the litter conditioner 100 and/or characteristics or effectiveness of a litter conditioning process.

Figure 2:
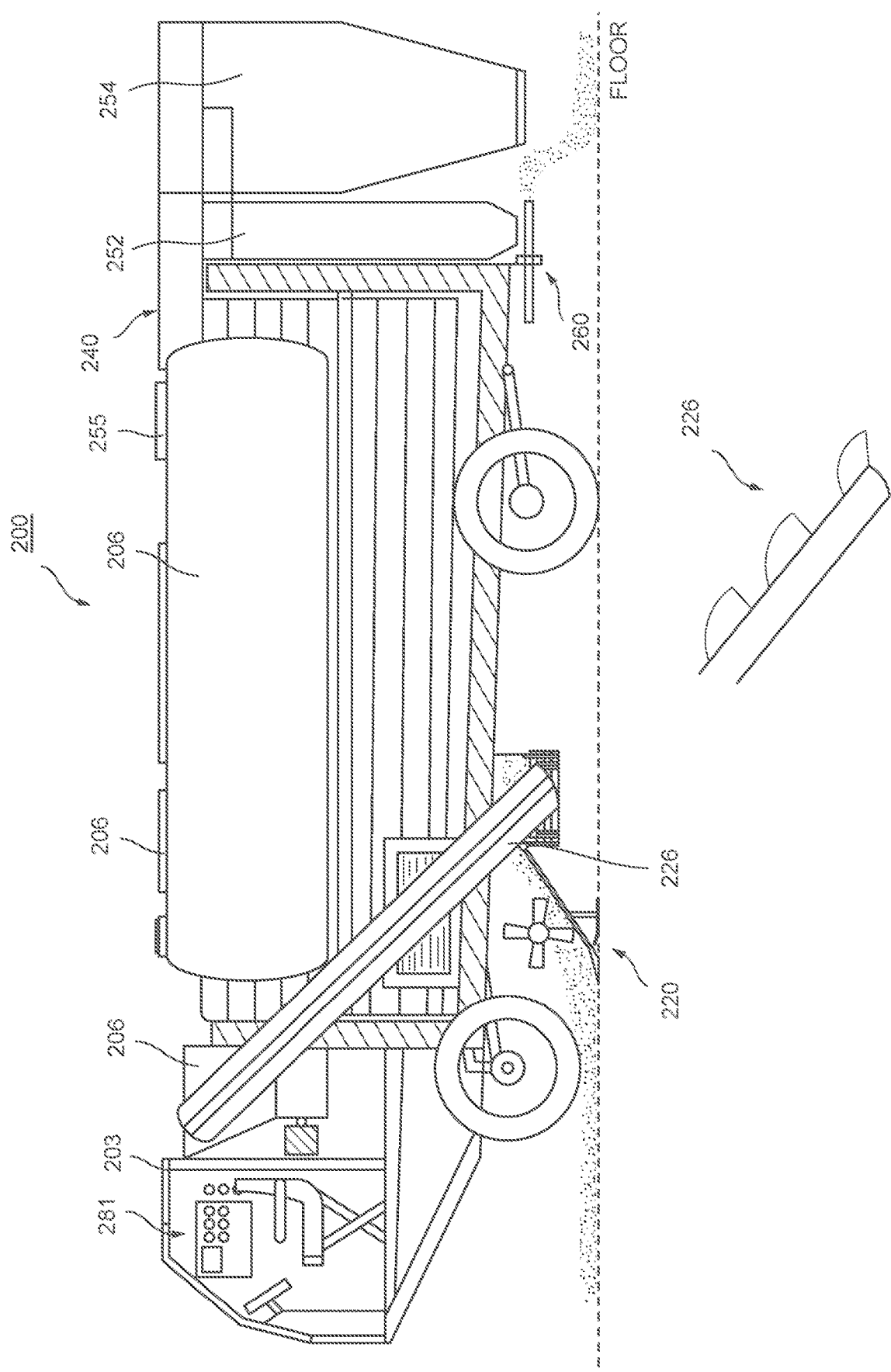
FIG. 2 is a side view illustration of an at least semi-autonomous litter conditioner according to an embodiment.

FIGS. 2-13 illustrate an at least semi-autonomous litter conditioner 200 according to an embodiment. FIG. 2 is a side view of the at least semi-autonomous litter conditioner 200 (also referred to herein as "litter conditioner") and shows that the litter conditioner 200 can include a driver's compartment 203 having a steering wheel, driver's seat, and/or controls 281 for controlling operation of the litter conditioner 200. In certain embodiments, the litter conditioner 200 can be pulled and/or pushed by one or more other vehicles (e.g., tractor-pulled). In certain embodiments, any system of the litter conditioner 200, or even the entire litter conditioner 200, can be controlled remotely, automatically, semi-autonomously, and/or fully autonomously. Such fully autonomous embodiments, for example, need not include the driver's compartment 203, shown in FIG. 2.

Figure 3:
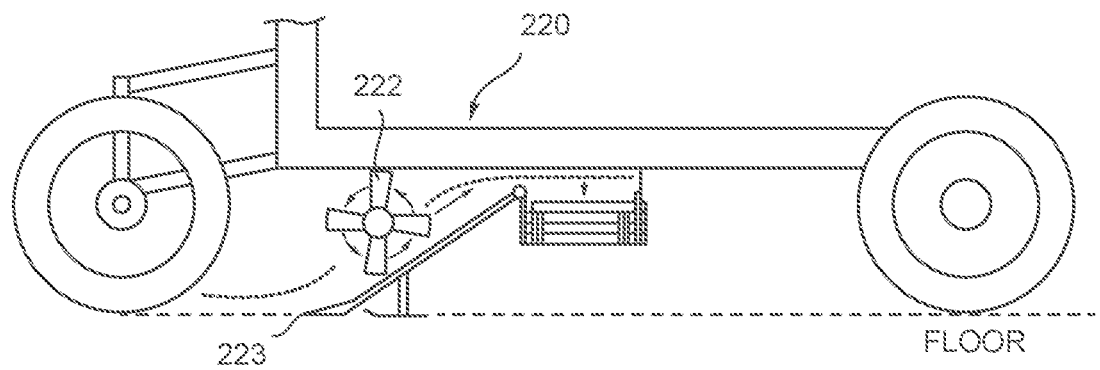
FIGS. 3 and 4 are side view illustrations of a portion of the litter conditioner of FIG. 2.
Figure 4:
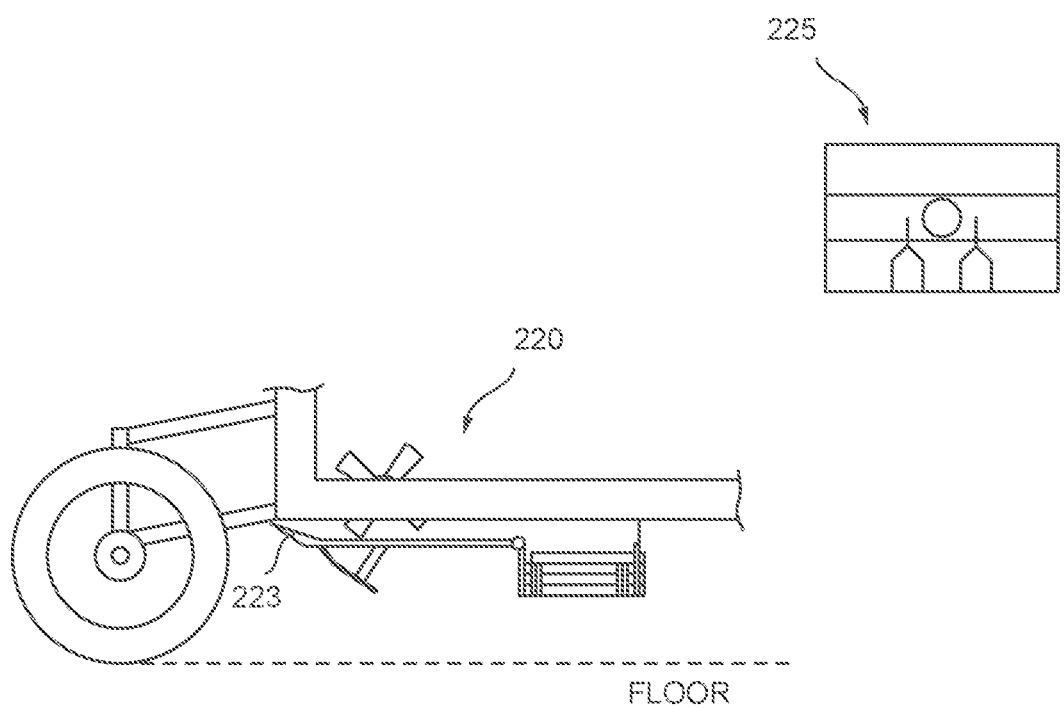

FIG. 2 shows the litter conditioner 200 including at least a collection system 220, a conditioning system 240, and a dispersement system 260. FIGS. 3-6 are various views showing one or more portions of the collection system 220. The collection system 220 can include a plate, scoop, and/or plow 223 that can lift litter off the floor. In certain embodiments, the litter collection system 220 can include an augering component configured to lower to the floor and/or be effective for picking up and/or transferring litter and/or reducing particle size. FIG. 3 shows the plate, scoop, and/or plow 223 (referred to herein as "scoop") in an extended and/or operational position, and FIG. 4 shows the scoop 223 in a retracted position that can be better positioned for transportation of the litter conditioner 200, for example, when outside of a poultry house. In other words, the collection system 220 can be transitioned between a first state and/or configuration, in which the collection system 220 can collect litter off of the floor, and a second state and/or configuration, in which the collection system 220 does not collect litter off of the floor.

FIG. 4 shows that the litter condition 200 can include a self-leveling system 225. In certain embodiments, a self-leveling system can be used to keep a longitudinal axis extending through a portion of the conditioning system 240 within a specific operating range, such as by locking the position of either a front or rear axle and/or by automatically adjusting the other axle. The litter conditioner 200 can include a control system having any suitable components to operate the self-leveling system 225. In some implementations, an operator can set the desired operating level (e.g., height, angle, orientation, etc.) for the litter conditioner 200, then as the litter conditioner 200 travels across uneven surfaces, it can automatically self-level to maintain the set/desired angle of, for example, the longitudinal axis of the portion of the conditioning system 240, such as with respect to horizontal. This leveling can help ensure the litter maintains a consistent amount of dwell time in the conditioning system 240. Alternative approaches for ensuring the desired dwell/exit temperature combination can include adjusting and/or otherwise self-leveling only the conditioning system 240.

Figure 5:
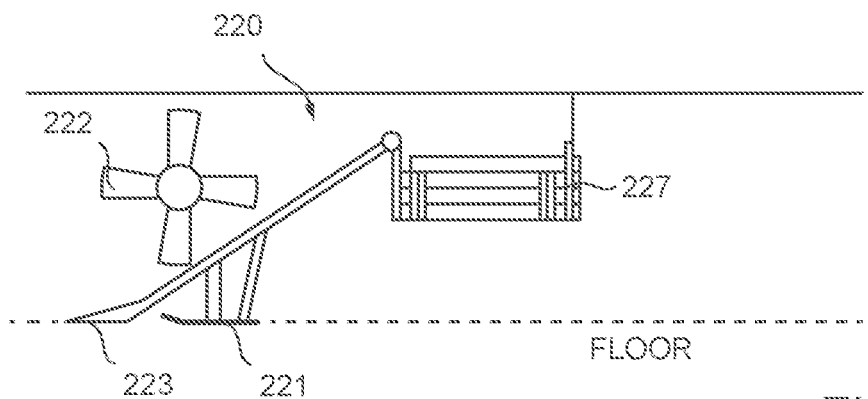
FIG. 5 is a side view illustration of at least a portion of a collection and conveying assembly included in the litter conditioner of FIG. 2.

FIG. 5 is a side view of the collection system 220 showing the scoop 223, a flailer 222, a cross-conveyor 227, and a skid plate 221. The skid plate 221 can mechanically support and/or spread the weight of the scoop 223, flailer 222, and/or cross-conveyor 227 and/or can limit or substantially prevent the scoop 223 from digging into the floor.

Figure 6:
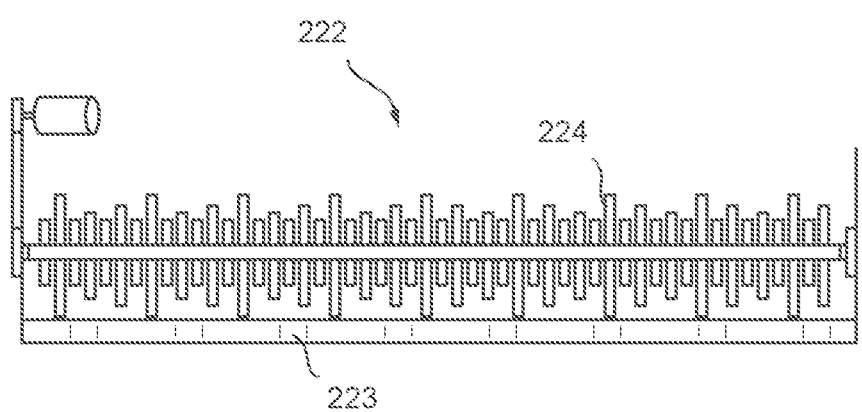
FIGS. 6 and 7 are a front view illustration and a side view illustration, respectively, of a flailing assembly included in the litter conditioner of FIG. 2.
Figure 7:
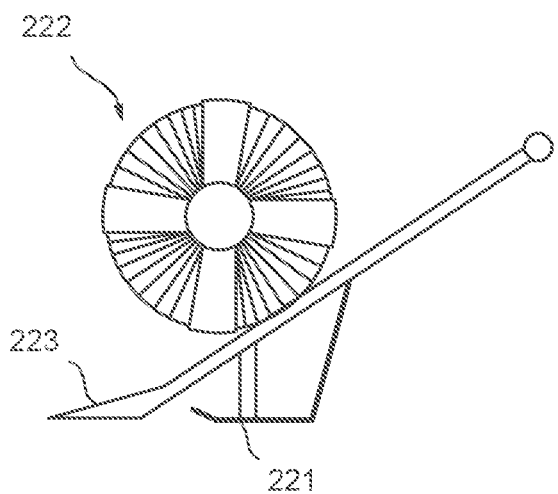

FIG. 6 is a front view and FIG. 7 is a side view of a portion of the collection system 220 showing the flailer 222. Once litter is lifted a sufficient distance up the scoop 223, the flailer 222 can help break-up the litter and/or can toss the litter further up the scoop 223 and/or onto the cross-conveyor 227 (or any other transfer system) that can direct the litter to a lift system or conveyer 226 (see FIG. 1). Other options to assist the litter onto the cross-conveyer 227 and/or other transfer system could include a drag chain system, conveying system, auger system, paddle system, etc. Other systems could be effective in breaking up larger particles such as tumbling, augering, and/or stirring, etc.

FIG. 6 shows a front view of the flailer 222. The flailer 222 can include any number of radially-extending cleats 224 mounted to shaft or central portion of the flailer 222. In some implementations, the cleats 223 can be arranged longitudinally along the shaft or central portion of the flailer 222 in a spiral fashion, as shown in FIG. 7. Other systems that can be configured to reduce particle sizes could include those utilizing augering, beating, stirring, tumbling, etc.

Figure 8:
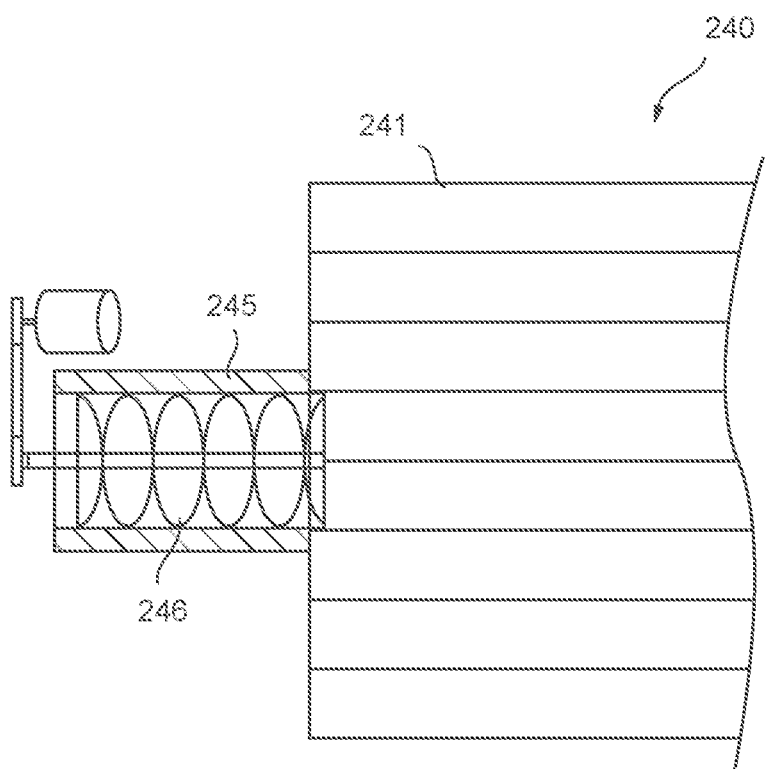
FIGS. 8 and 9 are side view illustrations of at least a portion of a conditioning assembly included in the litter conditioner of FIG. 2.
Figure 9:
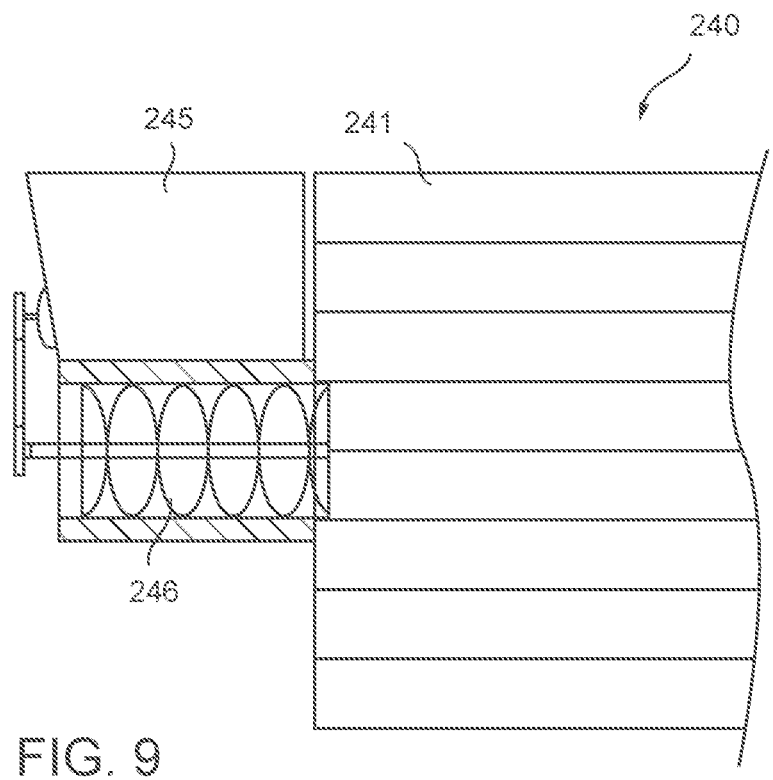
Figure 12:
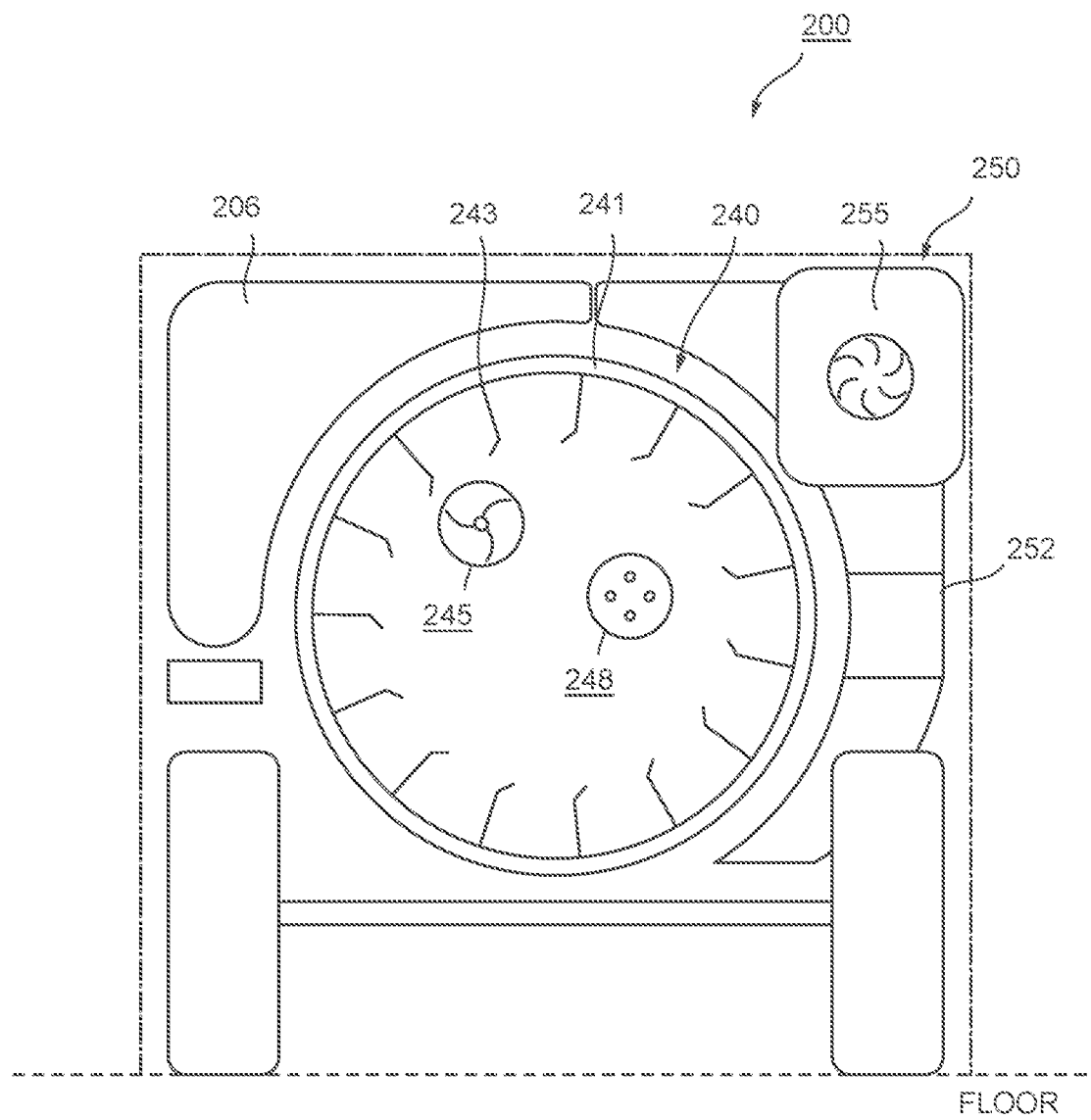
FIG. 12 is a rear view illustration of at least a portion of the litter conditioner of FIG. 2 and showing, for example, a portion of the conditioning assembly of FIGS. 8 and 9.

FIGS. 8 and 9 show portions of the conditioning system 240. In certain implementations, a lift system can transfer litter from the collection system 220 and can drop the litter into an infeed hopper or mechanism 245, which can feed the litter to an augering system 246 that can then deliver the litter into the rotating drum 241. Any drum-style apparatus that can tumble the contents can be effective. For example, the drum 241 can be a grain-roasting-style drum that has been modified for conditioning litter. Examples of how the drum 241 can be modified are to decrease the number of flights, enlarge the flights to hold a larger amount of litter, and/or remove sections of the flights, which can help cause additional litter cycling and/or more effective heat exchange. Removing sections of flights also can increase the volume of litter tumbling in the drum 241 in the area of the removed sections, which can lead to more effective heat exchange and/or allow for the length of the drum 241 to be reduced. FIG. 12 shows an example of flights 243 disposed in the drum 241 but other configurations are possible.

Figure 10:
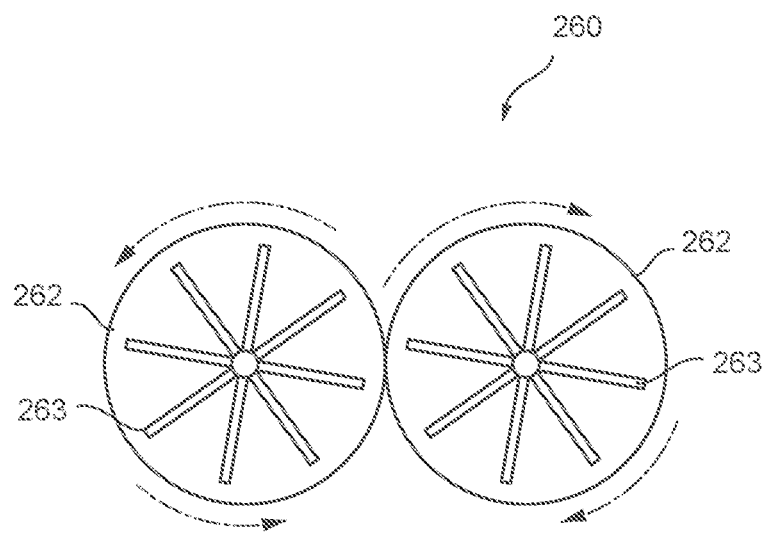
FIGS. 10 and 11 are a top view illustration and an end view illustration of at least a portion of a spreading assembly included in the litter conditioner of FIG. 2.
Figure 11:
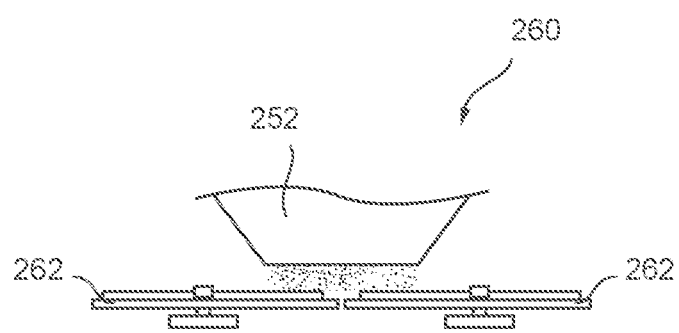

FIGS. 10 and 11 are a top view and a rear view, respectively, of a portion of the dispersement system 260. As the conditioned litter exits the rotating drum 241, it can enter a shroud and/or hopper 252 that drops the litter onto one or more rotating disk-type spreaders 262 that are configured to spread the litter from the rear of the litter conditioner 200 and back onto the floor of the poultry house. The rotating disk-type spreaders 262 can include any number of cleats 263 and/or the like that can help spread and/or toss the conditioned litter onto the floor.

Figure 13:
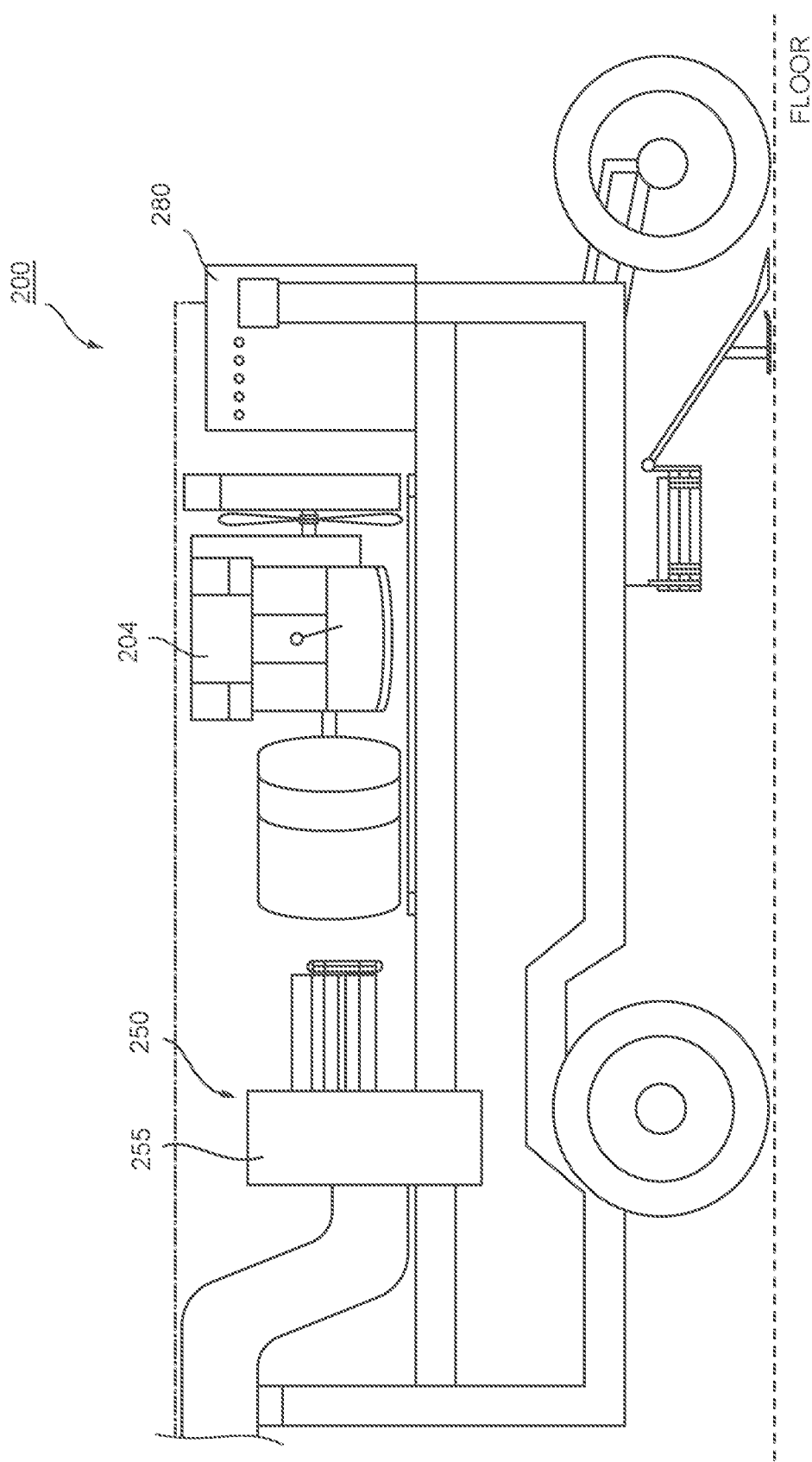
FIG. 13 is a side view illustration of at least a portion of the litter conditioner of FIG. 2 and showing, for example, a portion of the spreading assembly of FIGS. 10 and 11.
Figure 14:
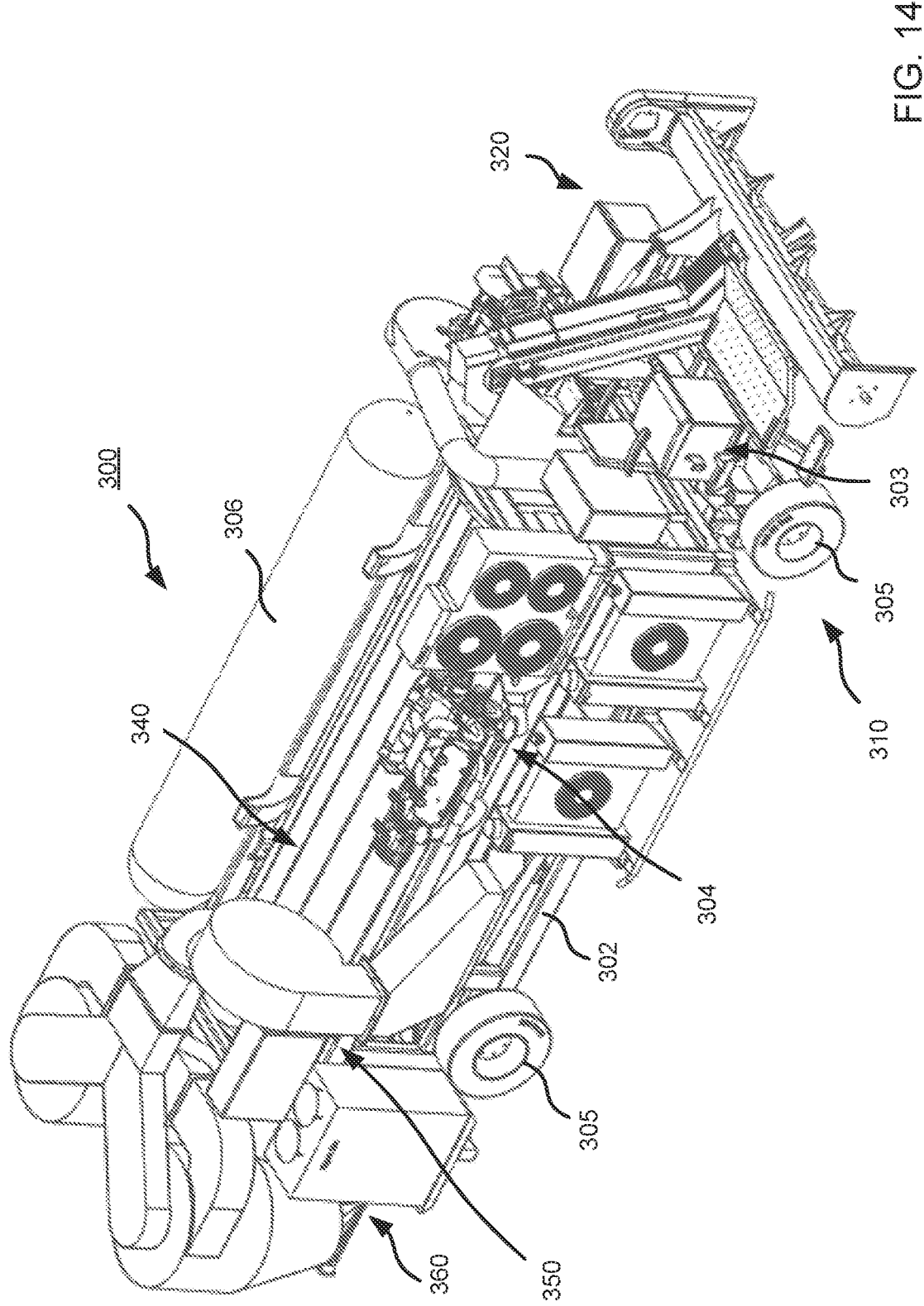
FIGS. 14 and 15 are a front view illustration and a rear-perspective view illustration, respectively, of an at least semi-autonomous litter conditioner according to an embodiment.
Figure 15:
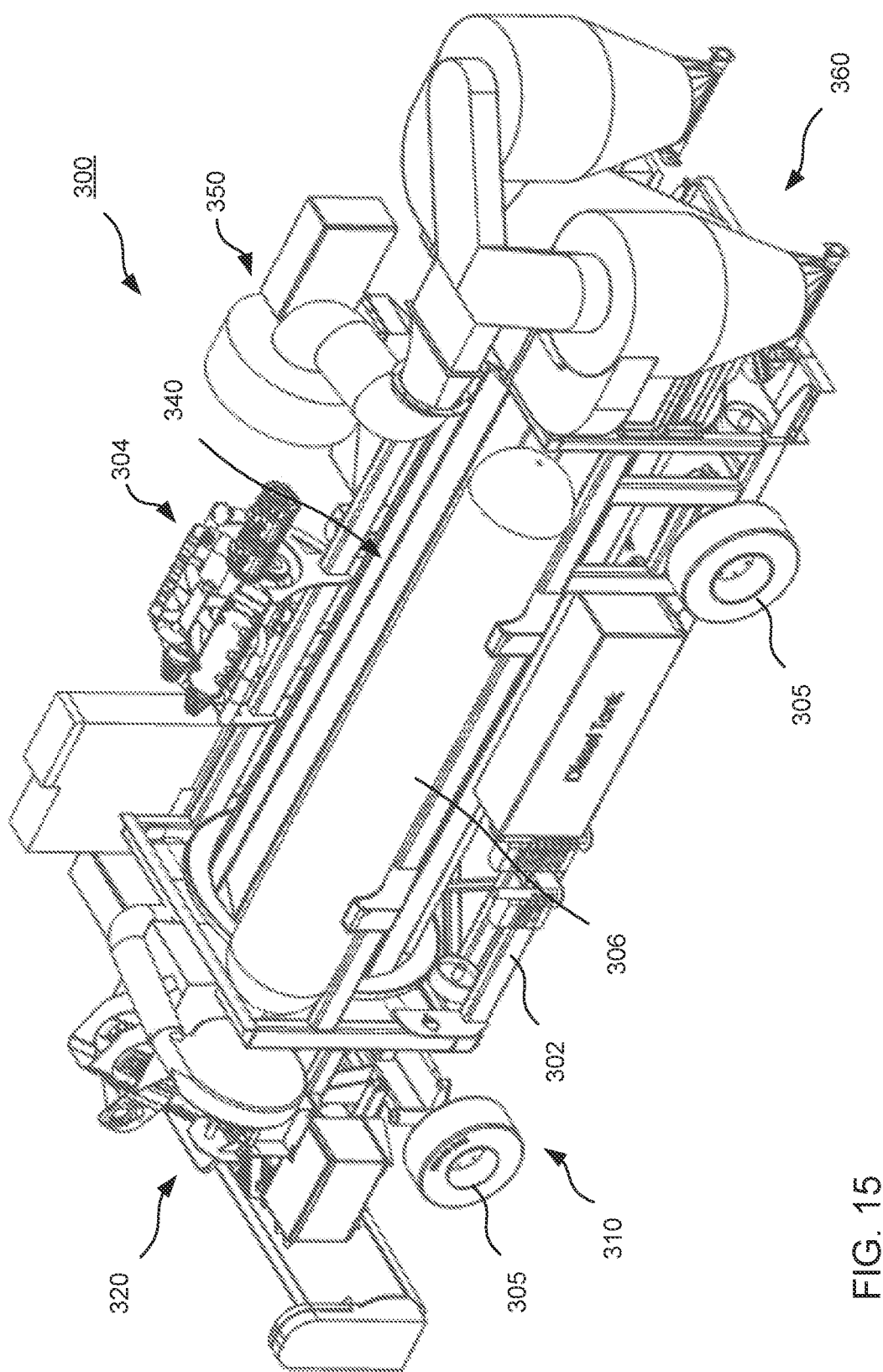
Figure 16:
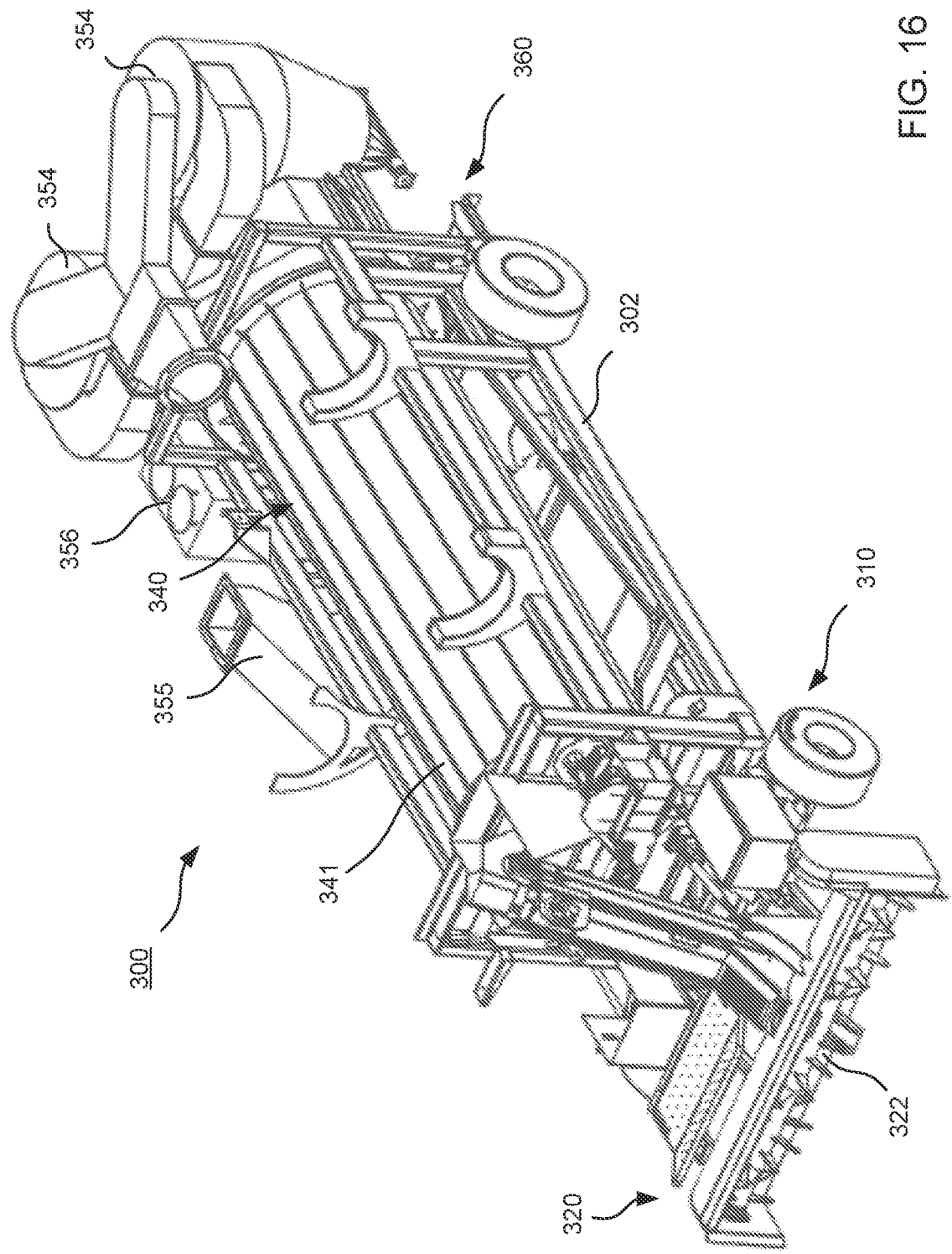
FIGS. 16-20 are various views illustrating one or more systems of the litter conditioner of FIG. 14.
Figure 17:
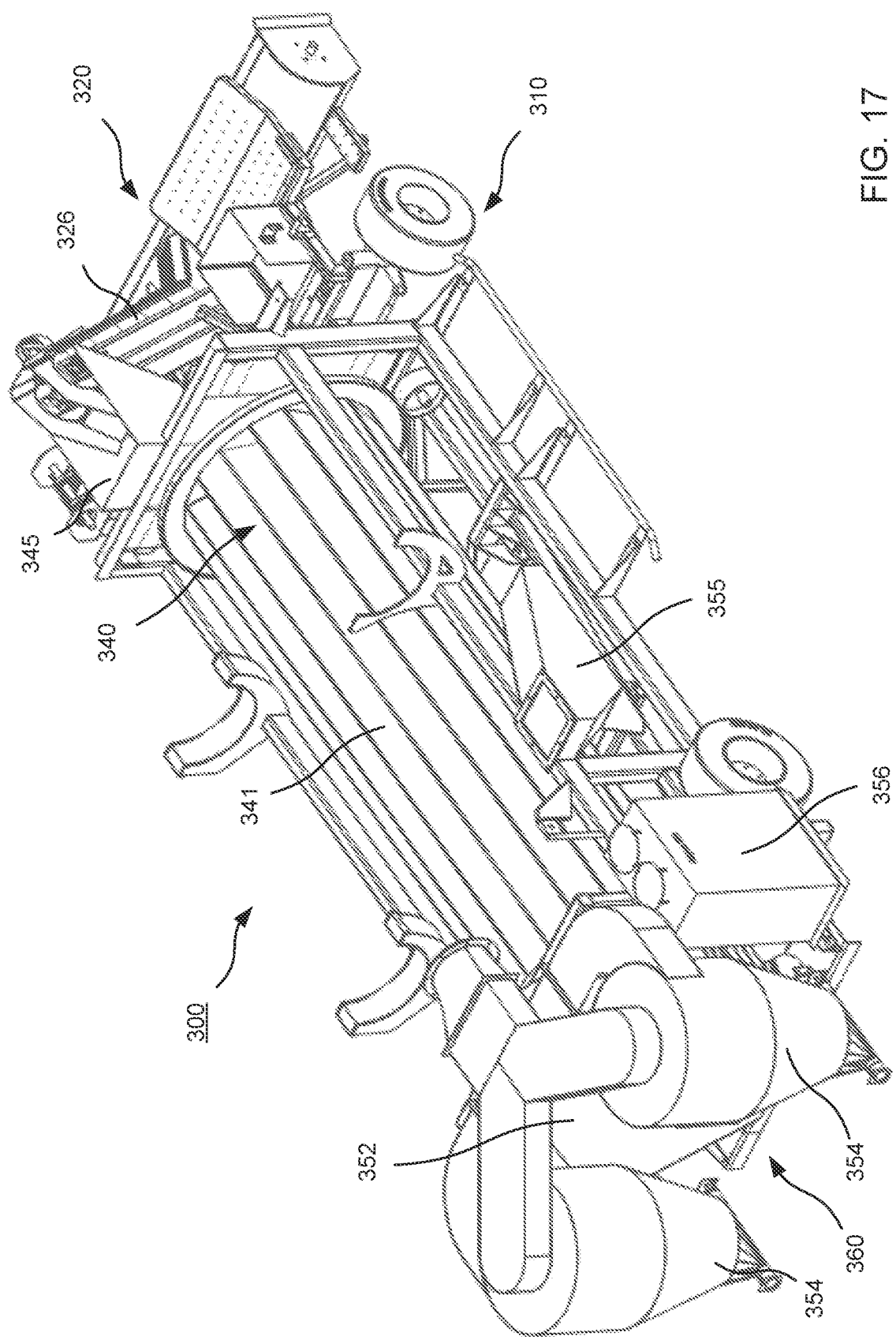
Figure 18:
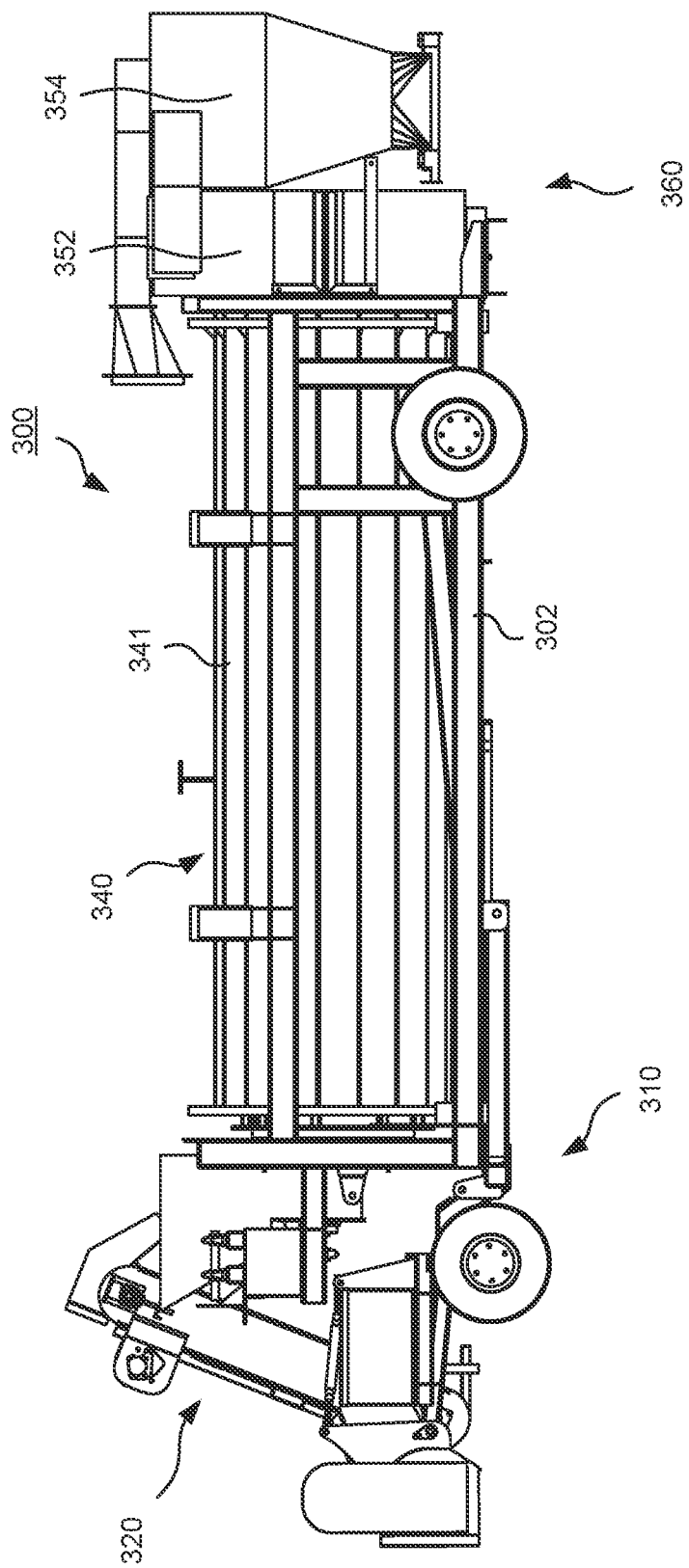
Figure 19:
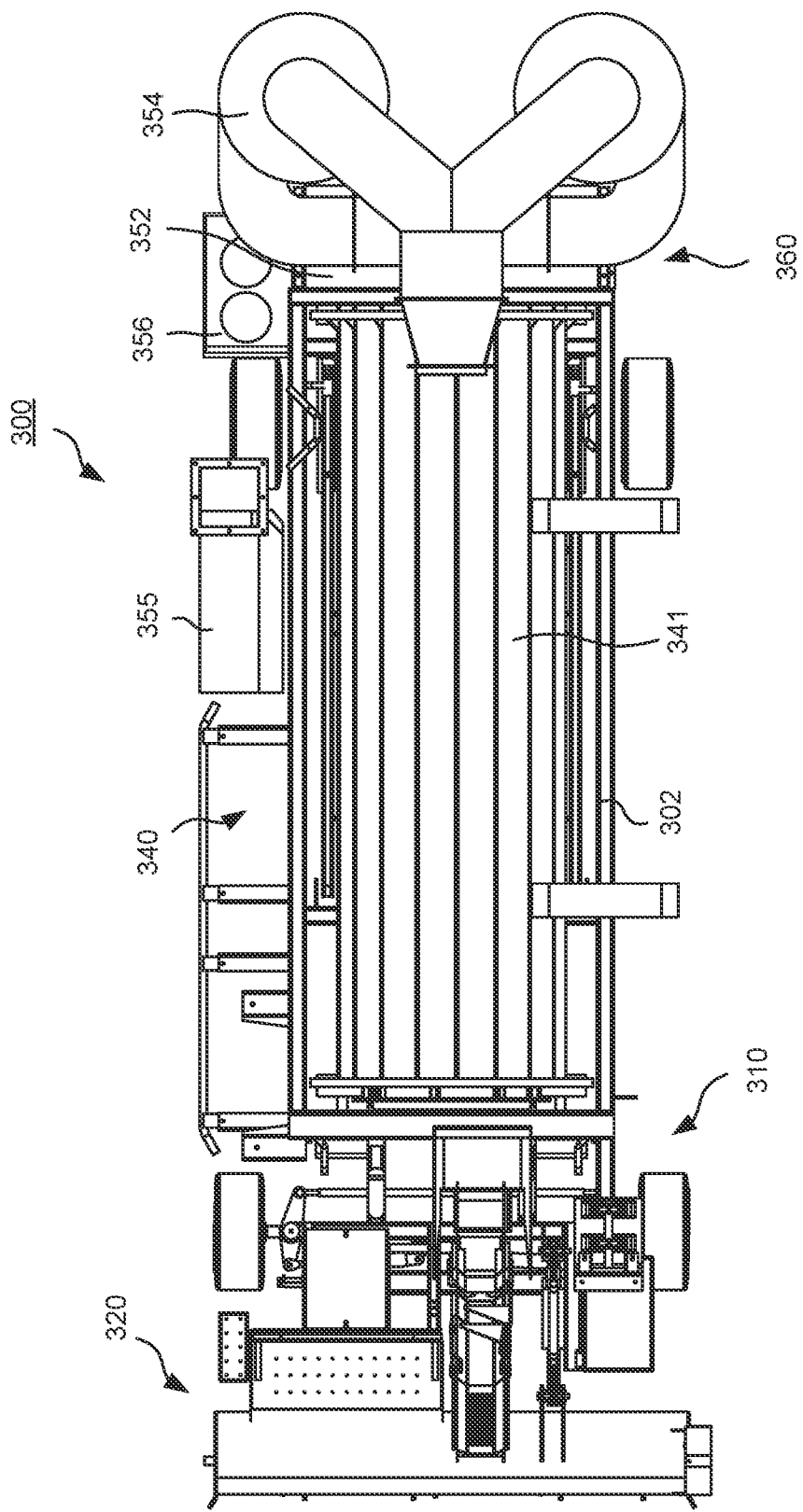

FIGS. 12 and 13 also show a dust collection system 250 that can include a blower 255 and ductwork 252 that can be configured for extracting exhaust and/or litter dust from the drum 241 and venting it to a shroud and/or toward the floor of the poultry house. FIG. 12 is a rear view of the litter conditioner 200 and shows a fuel tank 206 that can be configured to substantially maximize its fuel-holding capacity while fitting within a desired cross-sectional profile of the litter conditioner 200 (e.g., staying under a predetermined height and/or allowing sufficient room for other components of the litter conditioner 200. FIG. 12 further shows a heating element or burner 248 disposed in the drum 241 and configured to condition (e.g., heat treat) the litter as it is tumbled in the drum 241. FIG. 13 shows a power generation system 204 that can include an engine and/or convertor and/or generator for providing the litter conditioner 200 with mechanical and/or electrical power.

A litter conditioner can include and/or utilize any of the components, features, systems, and/or the like or combinations thereof described above with reference to the litter conditioner 100 (FIG. 1) and/or the litter conditioner 200 (FIGS. 2-13). Various options, configurations, and/or embodiments, are possible and nonlimiting examples of certain embodiments are provided below. While specific examples may be provided below with reference to certain embodiments, it should be understood that other embodiments are possible having any combination of the features so described.

In certain embodiments, a litter conditioner can utilize a substantially cylindrical, substantially horizontally-extending, rotating drum with one or more spiraling flights attached to the inner circumference of the drum and/or that are sized to hold specific amounts of the litter to be conditioned. The drum can be constructed from any suitable material, including copper, steel, coated steel, galvanized steel, and/or stainless steel. In one end of the drum can be mounted an infeeder and/or infeed mechanism (e.g., auger, conveyor, drag chain, slide chute, and/or apparatus configured to deliver the litter into the drum, etc.) configured to deliver litter into the drum. Mounted in the drum can be a heat source and/or element (e.g., the heating element 248), such as a burner, steam injector, heater, and/or gas inlet, the heat source configured to apply heat to the litter. The location of the heat source, any flame size, flame temperature, flame orientation, drum diameter, litter infeed rate, and/or speed at which the drum rotates can ensure the litter is properly conditioned during its time within the drum. The drum can be insulated (e.g., wrapped with rockwool) and/or jacketed (i.e., covered with another layer of stainless, galvanized, sheet metal or any form of noncombustible layer) to substantially lower and/or minimize heat transfer through to the outer perimeter of the drum, thereby helping to make the conditioner safe for indoor use and/or more energy efficient.

In certain embodiments, a litter collection system can collect litter off the floor and feed it into the conditioner. Such collecting/feeding can be performed in any number of manners, including using any of scooping, plowing, grasping, sweeping, conveying, augering, vacuuming/pneumatics, etc. For example, the conditioner can include a scoop that can be configured to lower to the floor for scraping up/collecting litter from the floor of the poultry house. The lower edge of the scoop can have skids mounted underneath that are configured to ensure the scoop slides on the floor surface and/or does not cut into the floor. The upper end of this scoop can be mounted on the front side of a cross-conveyer and/or transferring system. Mounted about midway up this scoop can be a litter flailing system ("flailer") that can be designed to refine the litter, break up any larger particles to ensure a substantially even heat distribution once the litter is in the drum, and/or the like. The flailing system can be constructed of a shaft with spiraling rows of protruding cleats. The flailing system can operate at approximately 30 RPM to approximately 400 RPM, including all values and sub-ranges therebetween. In other embodiments, the flailing system can operate at lower than 30 RPM or greater than 400 RPM. In some implementations, the litter conditioner may variably adjust the RPM based on a size and/or density of clumps or cakes in the litter. Each cleat can have a predetermined clearance (e.g., approximately ¼ inch). Particles up to several inches can be effectively conditioned, but for more consistent results, the size of such particles can be reduced by the scoop to increase the particle/clump break up. The flailing system can cross function as a tool to also toss the litter onto the cross-transfer system and/or eliminate piling up of litter on the sloped scoop. In some implementations, for example, the flailing system can toss, shovel, and/or direct litter into the cross-conveyer and/or transfer system substantially without rotating.

In certain embodiments, the cross-conveyer and/or other transfer system can be stationery and/or mounted underneath the drum. The cross conveyor can be configured to operate with a cupped rubber belt. Other design options can include a plowing system, vacuum system, metal drag chain system, and/or an auguring system, etc. The cross-transfer system can deliver the litter from the plate to a lifting system that transports the litter to a hopper and/or a drum infeed system. The lifting system can be used to transport the litter up an incline and/or can be a conveyor style system utilizing cupped metal and/or plastic conveyer cleats. Other design options can include a vacuum system, scooping system, metal drag chain system, and/or an auguring system, including any form of system that can collect the litter from the floor and deliver the litter into the drum, etc.

In certain embodiments, once the litter drops into the infeed hopper and/or mechanism at the front of the drum, a particle infeed system, such as an auguring system, drag chain system, paddle system, etc., can deliver the litter in a substantially consistent manner into the drum for heat treatment. In certain implementations, the infeed system (e.g., an auger) can rotate at and/or with any suitable speed that results in a desired infeed flowrate, particle size, and/or the like. The infeed system and/or mechanism can be located in the bottom of the hopper, which can help refine and/or break up the litter to help ensure the particle size is inside the desired operating parameters. When an auger is utilized for the infeed system, its components and/or clearances to the edge of the auger trough can be configured to enhance clump and/or particle break up, such as to ensure a maximum particle size and/or a an average maximum particle dimension of, for example, approximately 0.20 inches to approximately 1.0 inches, including all values and subranges therebetween. In other implementations, the average particle size can be less than 0.20 inches (e.g., less than 0.15 inches, 0.10 inches, or smaller) or greater than 1.0 inches (e.g., up to 1.5 inches, 2.0 inches, 2.5 inches, 3.0 inches, 3.5 inches, 4.0 inches, or greater). While examples of particle sizes are provided, it should be understood that the particle sizes are presented by way of example only and not limitation. While capable of conditioning litter with any suitable particle size, heat transfer effectiveness might be improved with improvements in the uniformity of particle size and/or otherwise with smaller average particle sizes. The inclusion of such an infeed system that reduces the particle size is such that a particle size of the litter is reduced a first amount and/or reduced to a first average particle size during collection (e.g., by the flailer) and is then reduced a second amount and/or reduced to a second average particle size during infeed (e.g., by the infeed system such as an auger or the like).

In certain embodiments, a drum dwell time can be any suitable amount of time sufficient to condition the litter. In some implementations, conditioning can be associated with and/or measured by, for example, reduced levels of ammonia (sometimes referred to as ammonium nitrogen, nitrate nitrogen, and/or organic nitrogen) in the litter and/or in the air in the house or enclosure. In some implementations, conditioned litter can have ammonia levels between, for example, approximately 0.0 parts per million (ppm) and approximately 40.0 ppm, between approximately 5.0 ppm and approximately 25.0 ppm, and/or any other suitable range, including all values and sub-ranges therebetween. In some implementation, conditioning can be associated with and/or otherwise measured by a percentage reduction in ammonia level. For example, in some implementations, conditioning litter can result in between approximately 10% reduction in ammonia level and approximately 100% reduction in ammonia level, between approximately 50% reduction in ammonia level and approximately 100% reduction in ammonia level, and/or any other suitable range, including all values and sub-ranges therebetween. In some instances, ammonia levels can be measured and/or confirmed using a standard tube or paper test kit and/or an electronic device.

In some implementation, conditioning can be associated with and/or measured by, for example, a desired portion of pathogens in the litter that are killed during conditioning. For example, in some implementations, conditioning can kill between approximately 75% and approximately 100% of the pathogens in the litter, including all values and sub-ranges therebetween). In some implementations, an amount of conditioning can be at least partially based on a dwell time of the litter in the conditioning system (e.g., drum). In some implementations, a dwell time can range from approximately 20 seconds to approximately 300 seconds (including all values and sub-ranges therebetween). The litter can tumble in the rotating drum, somewhat like clothes tumbling in a clothes dryer, and/or can advance along the length of the drum toward a heating element such as an open flame created by a burner, and/or any other suitable heating element. As the litter is heated and begins to dry, it can emit steam, which can aid in transferring heat from one litter particle to one or more other litter particles without necessarily burning, charring, combusting, and/or turning the litter into ash.

In certain embodiments, at the end of the drum can be an exhaust collecting shroud system that can be configured to collect the exhaust heat, potentially while allowing conditioned litter to drop and/or be delivered out the bottom of the shroud. A blower can be mounted on the conditioner to draw the exhaust from the shroud and/or through a (optional) dust collection system (such as a cyclone style dust collector), and/or via a system of piping, blow the exhaust downward and/or onto the floor so that the exhaust need not cause heat damage to poultry house ceilings and/or anything overhead of the conditioner. The shroud and/or cyclones can be configured in a manner that they do not protrude beyond the desired profile of the conditioner.

In certain embodiments, a litter dispersement system that can spread the litter onto the floor behind the conditioner, potentially in a manner that resembles the pattern, placement, and/or topography of the litter prior to being picked up. The desired and/or predetermined dispersement pattern can be achieved by mounting the litter dispersement system under the exhaust shroud so that when the litter drops and/or is delivered out of the bottom of the shroud, it can drop onto two oppositely rotating disks with small cleats standing upright that can evenly spread/toss the litter onto the floor behind the conditioner. The width that the litter is spread can be controlled by the variable speed adjustment of these disks. Other methods to achieve this dispersement and/or spreading of litter can include cross-augering, plowing, dragging, and/or conveyors.

In certain embodiments, one or more temperature sensors, which can be located, for example, at the exiting point of the drum, inside the drum, and/or in the exhaust shroud and/or exhaust system, can measure exhaust temperatures and/or exiting conditioned litter temperatures and/or provide that information to the conditioner's control system. Temperature management can control litter flow, therefore litter flowrate itself might not need to be monitored. Sensors can be located at the infeed auger to ensure litter is consistently feeding into the drum and/or can monitor the particle size (e.g., optical and/or visual monitoring), velocity, and/or flowrate. The system can be designed to automatically shut off the fuel, air, burner, drum, auger, and/or any portion and/or system of the conditioner should one of these temperatures exceed a set point and/or should litter and/or the proper amount of litter no longer be feeding into the drum. Back up temperature sensors can be used to ensure that failure of a primary sensor need not create a hazard and/or safety issue.

In certain embodiments, the conditioner's control system can be mounted at any desired location, such as at the front of the conditioner and/or any location that allows for easy access by the operator. The control system can digitally display to the operator information that is necessary and/or helpful to ensure that the litter is being heated to the correct temperatures, and/or that the litter is moving at the proper flowrate, and/or that safety parameters are within specifications. The control system's user interface can have buttons for emergency shut down of the propane fuel, the burner, and/or any portion of the entire machine. The control system can monitor entering and/or exiting litter temperatures and/or flowrates and/or automatically make adjustments to speed up or slow down the rate at which litter is introduced to and/or leaving the drum so as to maintain the desired litter exit temperatures. The automatic adjustments can be made by increasing and/or decreasing the operating speeds of the infeed system, drum, the cross-transfer system, and/or the lifting systems in series and/or in parallel.

In certain embodiments, the conditioner can be configured to maintain a desired maximum operating height that provides a desired gap between the top of the conditioner and the bottom of the roof of the poultry house (that roof often constructed from a relatively easily combustible and/or meltable plastic material) (e.g., from 12 inches to 96 inches, including all values and subranges therebetween, such as, e.g., 78 inches) and/or can be able to be raised for transport mode and/or lowered for operating mode. In some embodiments, the conditioner can have a height greater than 96 inches. The front and/or rear axles can be built to raise and lower. The raising and/or lowering can be controlled by, e.g., arms that can be hydraulically adjusted (other methods could be used to achieve adjustable suspension such as direct hydraulic, an arm system, and/or an air bag system).

In certain embodiments, the conditioner can utilize a customized propane (or other fuel) storage tank, which can provide an adequate propane supply while maintaining a tight profile of the conditioner. The storage tank can be configured to surround the drum, such as for one-quarter turn, while fitting relatively tightly against the outer limits of the side and/or top profile. An additional layer of insulation and/or heat shield can be used to buffer the heat from the drum and/or protect the propane tank.

In certain embodiments, because the conditioner can be self-powered and/or self-contained, it can be outfitted with a power unit that can include an internal combustion engine and/or any other power source configured to power the shafts for the hydraulic pumps and/or electric convertor and/or electrical generator. The power unit can be adequately sized to power a hydraulic pump and/or an electric generator that can be mounted on the opposite side of the drum from the propane fuel storage tank.

In certain embodiments, the conditioner can be "self-powered" and/or "self-contained" and/or not require external forces, manipulation, controls, and/or instructions to operate. The drive tires of the conditioner can be electrically and/or hydrostatically driven by the hydraulic pressure from the power unit's hydraulic pump and/or electric system. Other methods can be used to power the drive wheels, such as a chain driven system powered by hydraulic pumps and/or a transmission with a drive shaft style system, etc. A cab, steering wheel, and/or operating dash/control panels can be mounted in the front and/or rear of the conditioner. The cab and/or seat for an operator can be strategically located to maximize an operator's viewpoints, while maintaining operator safety and/or comfort. The unit need not have a local operator, but instead can be operated and/or monitored remotely. The unit can exercise any degree of autonomy, including requiring no human supervision.

In certain embodiments, to condition litter (e.g., to bring the interior of each litter particle to a particular temperature and hold it there for a particular amount of time), alternative forms of heating can be utilized. For example, depending on the size/scale of the conditioner, an electric heater can be used instead of a burner. Alternatively, steam (rather than combustion gases and/or heated air) could be generated by the conditioner and applied to the litter. As another alternative, heat generated by the engine/generator can be applied to the litter (e.g., as a form of regenerative heating, using the exhaust or the like) to provide and/or augment the needed heating. If combustion is utilized, it can be fueled by any type of fuel, including propane, natural gas, gasoline, diesel, kerosene, fuel oil, vegetable oil, wood chips, pellets, and/or pieces, etc. The combustion can be fueled (or supplemented) by the litter itself and/or any other organic feedstock and/or product.

Similarly, in certain embodiments, mechanical power to propel the conditioner and/or to generate electrical and/or hydraulic power for the conditioner can be provided by an internal combustion engine and/or power source that is fueled completely and/or partially by any compatible fuel source (e.g., propane, natural gas, gasoline, diesel, kerosene, fuel oil, vegetable oil, etc.). Alternatively, batteries, converters, and/or fuel cells can provide electrical power to drive any system of the conditioner, including its propulsion, collection, lifting, conveying, heating, dispersing, and/or control systems, etc.

In certain embodiments, a conditioner can be scaled dimensionally, thereby potentially creating, changing, simplifying, and/or eliminating the need for one or more of its systems. For example, depending on its size, a conditioner might not need a dust suppression system and/or might be able to vacuum lift, plow, scoop, or chain drag the litter from the floor. In certain embodiments, a conditioner can be small enough and/or move forward slowly enough that it can safely move through a poultry barn while avoiding harming any birds during (rather than before and/or after) a flock/growing cycle, thereby frequently, periodically, and/or continuously conditioning the litter.

In certain embodiments, any of various systems of the conditioner can be operative on a variable speed and/or can adjust automatically. For example, the collection system can operate on variable speed determined by, e.g., the flowrate of litter desired to be introduced to the drum, the forward/ground speed of the conditioner, the depth of litter on the floor, and/or the flailing system speed. As another example, the rotational speed of the flailing system may be increased for barns/farms where more and/or larger clumps are present. As another example, the rotational speed of the drum can be varied to achieve a desired litter exit temperature.

In certain embodiments, a self-leveling system can be used to keep the longitudinal axis of the drum within a specific operating range, such as by locking the position of either the front or rear axle and/or automatically adjusting the other axle. The control system can operate the self-leveling system. The operator can set the desired operating level for the conditioner, then as the conditioner travels across uneven surfaces, it can automatically self-level to maintain the set/desired angle of the drum's longitudinal axis, such as with respect to horizontal. This leveling can help ensure the litter maintains a consistent amount of dwell time in the drum. Alternative approaches for ensuring the desired dwell/exit temperature combination can include self-leveling only the drum and/or adjusting the drum speed.

In certain embodiments, rather than trying to keep the drum level via a vehicle leveling system (e.g., described above with reference to FIG. 4), the drum rotation speed and/or heat supply (e.g., burner flame configuration and/or fuel flow to the burner) can be adjusted as needed to achieve and/or maintain a specified average dwell time and/or internal temperature for the exiting litter particles independent of a degree leveling of the drum. Generally, if temperature is lowered, dwell time can be increased to achieve a desired amount of conditioning (e.g., a desired amount of ammonia reduction and/or degree of pathogen elimination). Likewise, if temperature is increased, dwell time can be decreased to achieve the same level and/or amount of conditioning (e.g., the same level and/or amount of ammonia reduction and/or pathogen elimination).

Certain embodiments can employ any of gravimetric/volumetric feeders, silos and/or other storage vessels, dryers/coolers, mixers/blenders, screeners, crushers/grinders, packaging machines, and/or other bulk processing equipment. Such equipment can facilitate the collection of litter, the reduction in particle size of the litter, the transport and/or temporary storage of unconditioned and/or conditioned litter, the dispersement and/or spreading of conditioned litter, and/or the like.

FIGS. 14-29 illustrate a litter conditioning vehicle 300 according to an embodiment. The litter conditioning vehicle 300 (also referred to herein as "litter conditioner" or "vehicle") can be any suitable shape, size, and/or configuration that enables the vehicle 300 to operate within an animal house, facility, and/or enclosure. For example, the vehicle 300 can be configured to operate within the poultry house and/or the like. In other implementations, however, the vehicle 300 can be used in any suitable indoor or outdoor environment where it is desirable to condition litter contained therein. In certain embodiments, the litter conditioner 300 can be configured to maintain a desired maximum operating height that provides a desired gap between the top of the litter conditioner 300 and the bottom of the roof of the poultry house, which are often constructed from a relatively easily combustible and/or meltable plastic material, (e.g., from 12 inches to 96 inches, including all values and subranges therebetween, such as, for example, 78 inches) and/or can be able to be raised for transport mode and/or lowered for operating mode. In some embodiments, the litter conditioner 300 can have a height greater than 96 inches. The raising and/or lowering can be controlled by, for example, arms that can be hydraulically adjusted (other methods could be used such as direct hydraulics, an arm system, an air bag system, and/or the like).

Although not shown, the litter conditioner 300 can also include a control system that can include any suitable component, device, and/or the like such as one or more sensors, electronic devices (e.g., computers), controllers (e.g., a PLD, a PLC, etc.), memories, processors, communication interfaces, user interfaces, and/or the like. The control system can be configured to perform and/or execute one or more processes included in and/or associated with at least semi-autonomous control of the litter conditioner 300. In some embodiments, the control system can be similar to and/or substantially the same as the control system 180 described above with reference to FIG. 1. Accordingly, the control system and/or components or aspects thereof may not be described in further detail herein.

As shown in FIGS. 14-19, the litter conditioner 300 includes a chassis 302, a drive system 310, a collection system 320, a conditioning system 340, and a dispersement system 360. The chassis 302 can be any suitable structure configured to support one or more portions of the litter conditioner 300. The chassis 302 can include, for example, beams, rods, tubes, etc. formed from any suitable material such as steel, aluminum, and/or alloys thereof. The chassis 302 can be any suitable shape and/or size based at least in part on the components and/or systems included in the litter conditioner 300. In some implementations, the chassis 302 can be relatively low profile such that a height of the litter conditioner 300 is maintained below a predetermined height (e.g., a clearance height associated with animal enclosures and specifically, poultry houses). In some embodiments, the litter conditioner 300 can include a cabin and/or operator's area 303 where a human user can sit or stand and control one or more portions of the litter conditioner 300. Although not shown, the cabin and/or operator's area 303 can include any suitable user interface, control mechanism, computer, and/or component included, for example, in the control system of the litter conditioner 300 allowing an operator to at least partially control and/or operate the litter conditioner 300. While including a cabin and/or operator's area 303, the litter conditioner 300 can be configured and/or operated in, for example, a substantially autonomous mode without an operator present in the cabin and/or operator's area 303.

The drive system 310 is coupled to the chassis 302 and is configured to move the litter conditioner 300 along a floor (e.g., a floor of an animal enclosure). The drive system 310 can include any suitable component, machine, device, and/or the like. In some implementations, for example, the drive system 310 can include a set of wheels 305 (e.g., two wheels, three wheels, four wheels, five wheels, or more) that are operably connected to a power source 304. For example, in the embodiment shown in FIGS. 14-29, the set of wheels 305 (or at least a portion thereof) can be mechanically connected to an internal combustion engine or the like (e.g., the power source 304) via any suitable transmission, drive shaft, and/or mechanical linkage. The drive system 310 can further include any suitable suspension, linkage, steering mechanism, and/or the like configured to allow for control and/or steering of the litter conditioner 300. Although not shown, the drive system 310 can include any number of sensors, actuators, encoders, gauges, and/or the like configured to sense and/or detect one or more operating states of the drive system 310. In some implementations, the sensors, actuators, encoders, gauges, cameras, and/or the like can enable the control system of the litter condition 300 to control the drive system 310 in a semi-autonomous or substantially fully-autonomous manner.

The power source 304 can provide an output that results in rotation of at least a portion of the set of wheels 305. For example, in some embodiments, the drive system 310 can be configured as a front wheel drive vehicle, a rear wheel drive vehicle, and/or an all-wheel drive vehicle. As described in further detail herein, the litter conditioner 300 includes a fuel tank 306 that contains fuel used by the conditioning system 340 to condition litter. In some implementations, the power source 304 can be an internal combustion engine configured to use at least a portion of the fuel contained in the fuel tank 306. In some implementations, for example, the fuel tank 306 can contain fuel such as liquid propane and/or any other suitable combustible and the power source 304 can be configured and/or adapted to combust and/or otherwise use the fuel contained in the fuel tank 306. In other implementations, the power source 304 can be configured and/or adapted to combust and/or otherwise use fuel such as gasoline that is stored in a separate fuel tank (e.g., independent of the fuel tank 306).

FIGS. 20-23 are various view of the collection system 320 of the litter conditioner 300. The collection system 320 is coupled to a front portion of the chassis 302 and is configured to collect litter from the floor as the drive system 310 moves the litter conditioner 300 along the floor. In this embodiment, the collection system 320 is coupled to the front portion of the chassis 302 and in front of a front set of wheels 305 of the drive system 310. In some implementations, this arrangement can allow the collection system 320 (or at least a portion thereof) to be raised or lowered to contact the floor from which the litter is collected.

The collection system 320 can include any suitable component, machine, device, motor, and/or the like that can aid in and/or otherwise facilitate the collection and transport of litter from the floor such as, for example, a scoop, shovel, auger, flailer, etc. In this embodiment, the collection system 320 includes an active collection device that collects litter off of the floor using one or more rotating and/or moving components. Specifically, the collection system 320 includes a flailer 322 (and/or an auger) and a conveyer mechanism 326.

In some implementations, the flailer 322 can be and/or can include a rotating member that is disposed in and/or at least partially housed by a shroud 324 or the like. The flailer 322 can be any suitable device that can be rotated to break apart, lift, and/or toss litter from the floor and into a portion of the conveyer mechanism 326. In some implementations, the flailer 322 can be driven and/or powered (e.g., rotated) by an electric motor and/or the like. In other implementations, the flailer 322 can be driven and/or powered by the power unit 304 of the litter conditioner 300. In such implementations, the litter conditioner 300 can include any suitable gearing, transmission, linkage, belt, chain, etc. configured to operably connect an input of the flailer 322 to an output of the power unit 304. In other implementations, the flailer 322 can be driven and/or otherwise rotated in response to contact with the litter and/or floor. For example, the flailer 322 can be placed in contact with a portion of the floor such that motion of the litter conditioner 300 (e.g., via the drive system 310) results in the flailer 322 rolling along the floor (e.g., the flailer 322 is rotated). In some implementations, the flailer 322 can be operated in a powered mode in which the flailer 322 is powered, for example, by the power unit 304 or in a non-powered mode in which the flailer 322 is in contact with the litter to be collected and rotated in response to the drive system 310 moving the litter conditioner 300 along the floor.

Figure 20:
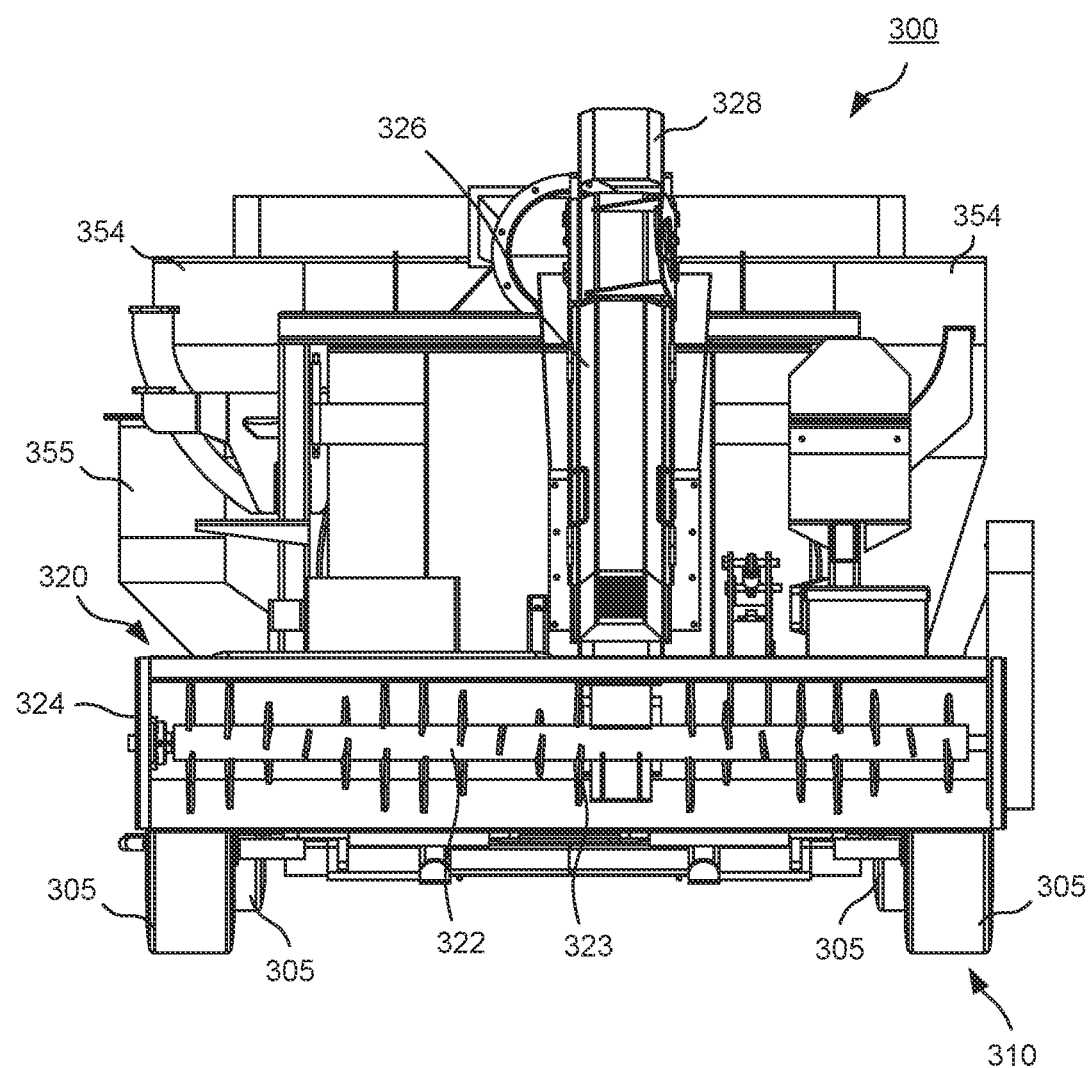

FIG. 20 shows the flailer 322 including a number of cleats 323 that can contact the litter disposed on the floor to at least partially break apart the litter and draw or move the litter into a portion of the conveyer mechanism 326. The cleats 323 can be, for example, protrusions, paddles, fins, tines, brushes, and/or the like. In some implementations, the flailer 322 and/or the cleats 323 thereof can be configured to reduce an average particle size of the litter as the flailer 322 collects the litter. For example, as described above, used litter can clump and/or cake as the litter retains moisture (e.g., moisture from animal manure and/or any other source). The flailer 322 and/or the cleats 323 can be placed in contact with the litter on the floor and the rotation of the flailer 322 can result in the cleats 323 chewing, penetrating, cracking, and/or otherwise breaking apart the litter into chunks and/or particles having a desired average particle size. In some implementations, the flailer 322 can be configured to break apart the litter such that an average particle size of the litter, for example, is less than 10.0 inches, less than 9.0 inches, less than 8.0 inches, less than 7.0 inches, less than 6.0 inches, less than 5.0 inches, less than 4.0 inches, less than 3.0 inches, less than 2.0 inches, and/or less than 1.0 inches. In some implementations, the collection system 320 and/or the flailer 322 can be configured to direct the collected litter into and/or toward an inner or central portion thereof to transfer the litter into the conveyer mechanism 326. For example, the flailer 322, the cleats 323, and/or the shroud 324 (or combination thereof) can have a shape and/or configuration that results in the litter being directed to the central portion of the collection system 320 (or at least a central portion of the flailer 322 or shroud 324).

Figure 21:
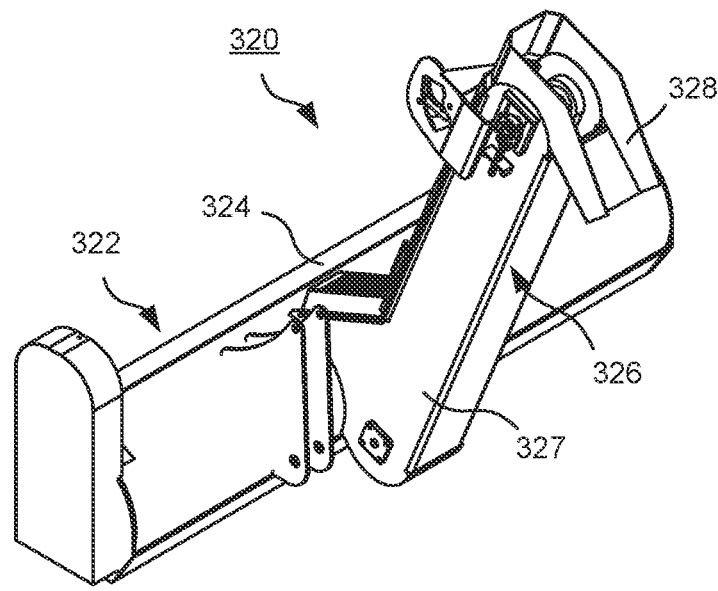
FIGS. 21-23 are various views illustrating at least a portion of a collection system included in the litter conditioner of FIG. 14.
Figure 22:
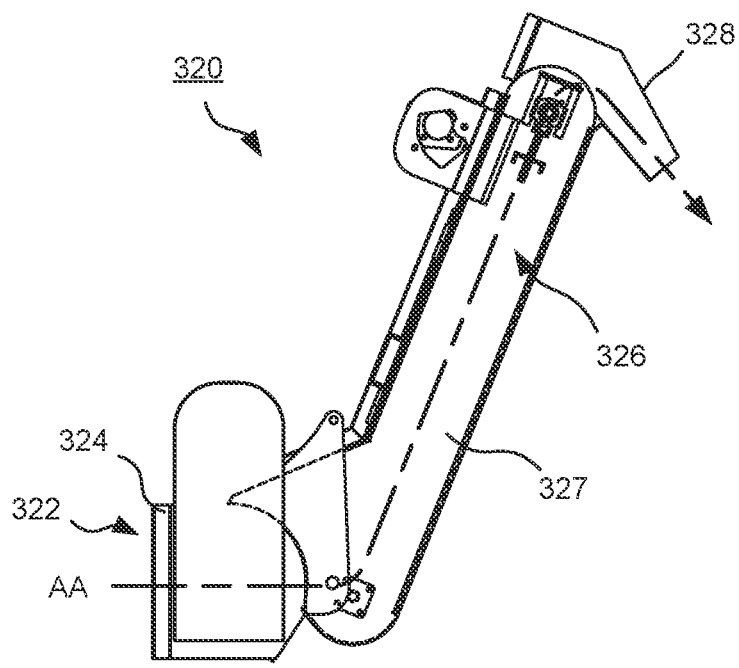
Figure 23:
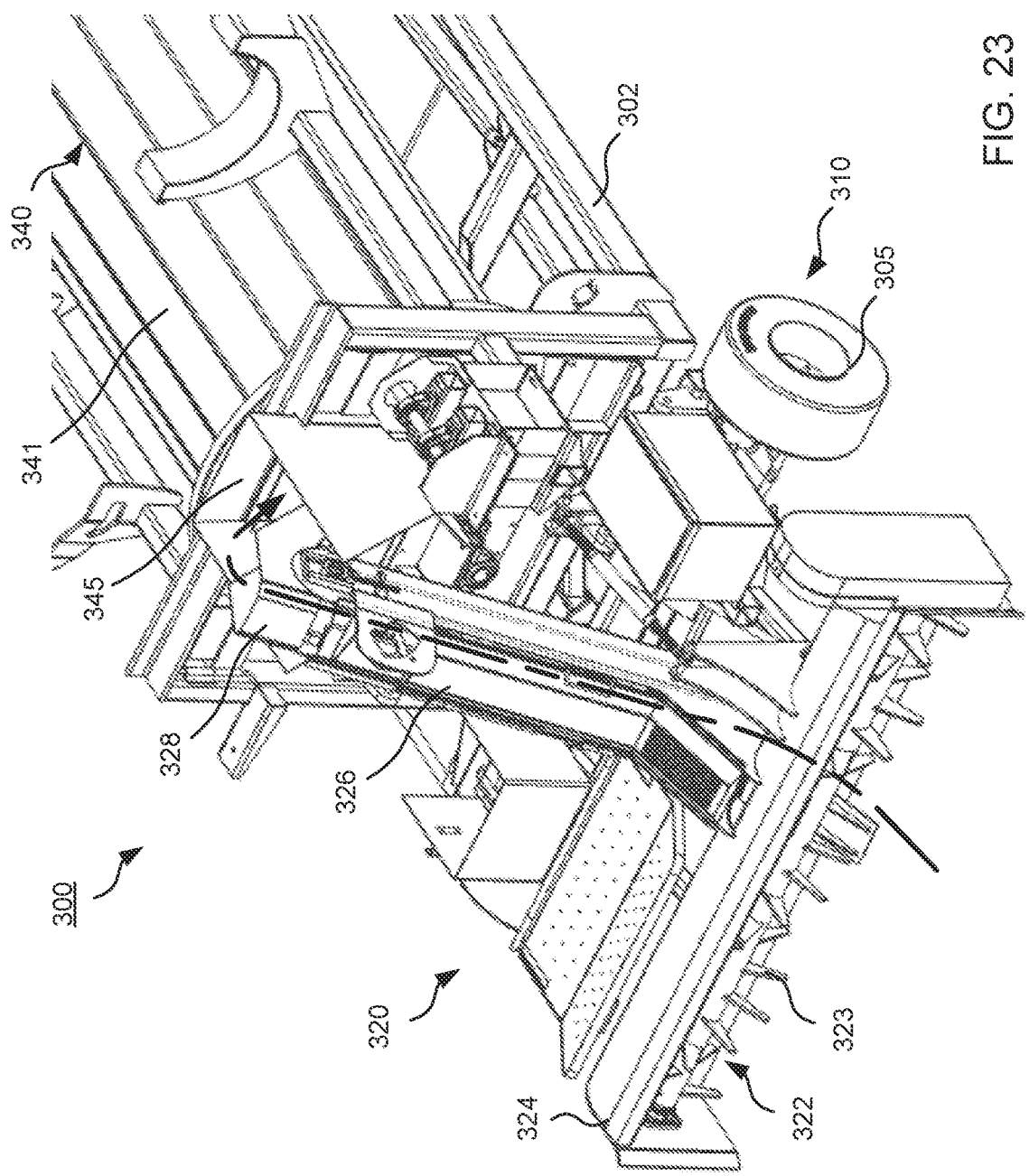

FIGS. 21-23 show the conveyer mechanism 326 coupled to, for example, a portion of the shroud 324 at least partially housing the flailer 322. The conveyer mechanism 326 can be and/or can include any suitable mechanism or device configured to transfer collected litter from the flailer 322 (or the shroud 324) to, for example, the conditioning system 340. For example, the conveyer mechanism 326 includes a shoot 327 that can house and/or at least partially enclose a conveyer (not shown) allowing the conveyer mechanism 326 to provide an inflow of litter into the conditioning system 340, as indicated by the arrow AA in FIG. 22 and the arrow BB in FIG. 23. In some implementations, for example, the conveyer can include cleats, scoops, etc. to facilitate advancement of the litter along the conveyer (as described above with reference to the litter conditioner 200). FIG. 23 shows the conveyer mechanism 326 as having a sloped configuration with a relatively low first end coupled to and/or in contact with the shroud 324 and a relatively high second end adjacent an infeed of the conditioning system 340. The second end of the conveyer mechanism 326 includes, for example, an outlet 328 configured to allow the litter to be transferred from a volume or space inside the shoot 327 to volume or space outside the shoot 327 (e.g., transferred into an infeed mechanism 345 of the conditioning system 340. In some implementations, the conveyer can be driven via a motor which can be the same motor driving the flailer 322 or can be a different motor. In some implementations, the conveyer mechanism 326 can include a vacuum source, blower, and/or the like to facilitate the transfer of the litter through the conveyer mechanism 326.

In some implementations, the collection system 320 can include one or more sensors configured to sense an operating state of at least a portion of the collection system 320. For example, the collection system 320 can include a sensor, encoder, and/or the like configured to sense an operating state such as, a power state of the flailer 322, a power state of the conveyer system 326, a power state of a blower or vacuum source, a rotational velocity of the flailer 322, a position of the flailer 322, shroud 324, or a portion of the collection system 320, a flowrate through the conveyer mechanism 326, and/or the like. In some implementations, the collection system 320 can include an optical sensor, camera, scanner, video recorder, and/or the like configured to capture images of the collected litter, which can be analyzed (e.g., by the control system 380) to determine, for example, an average particle size of the collected litter. Moreover, based on the average particle size, the control system of the collection system (not shown) can be configured to control one or more operating states of the collection system 320 to maintain, increase, and/or decrease the average particle size (e.g., increasing or decreasing a rotational velocity of the flailer 322, increasing or decreasing a flowrate through the conveyer mechanism 326, increasing or decreasing a velocity of the litter conditioner 300 along the floor, and/or the like).

FIGS. 23-29 illustrate one or more portions of the conditioning system 340 of the litter conditioner. The conditioning system 340 is coupled along a portion of the chassis 302 and is configured to condition the litter collected by the collection system 320. For example, the conditioning system 340 can be disposed on and/or coupled along the chassis 302 such that a first end portion of the conditioning system 340 (e.g., an infeed end) is disposed near or adjacent to the collection system 320 and a second end portion of the conditioning system 340 (e.g., an outlet end) is disposed near or adjacent to the dispersement system 360.

The conditioning system 340 can include any suitable component, machine, device, motor, heating element, and/or the like that can aid in and/or otherwise facilitate the conditioning of litter collected by the collection system 320. For example, the conditioning system 340 can include at least a drum 341, an infeed mechanism 345, and a heating element (not shown). The infeed mechanism 345. The infeed mechanism 345 is in communication with each of the collection system 320 and the drum 341 and is configured to transfer litter therebetween. In some implementations, the infeed mechanism 345 can include an infeed hopper and an auger. The infeed hopper, for example, is in communication with an outlet 328 of the conveyer mechanism 326 to receive a flow of litter, as indicated by the arrow BB in FIG. 23. The auger can be used to transfer litter from the infeed hopper into an inner volume of the drum 341. The auger can also be configured to reduce an average particle size of the litter as the litter is transferred into the drum 341.

In some instances, the auger can be adjusted and/or otherwise controlled to adjust and/or control an average particle size of the litter being transferred into the drum, a flowrate of the litter being transferred into the drum, and/or the like. For example, the control system (not shown) can include one or more sensors, cameras, scanners, etc. that can capture one or more images of the litter in the infeed mechanism 345, which can be analyzed to determine an average particle size of the litter received from the collection system 320. If the control system determines that a smaller average particle size is desirable, the control system can control and/or adjust, for example, an operating state of the auger to further reduce an average particle size of the litter. In other implementations, the control system can be configured to control and/or adjust an operating state of the auger to control a flowrate of litter into the drum 341 (e.g., with or without further reducing the average particle size of the litter).

Figure 24:
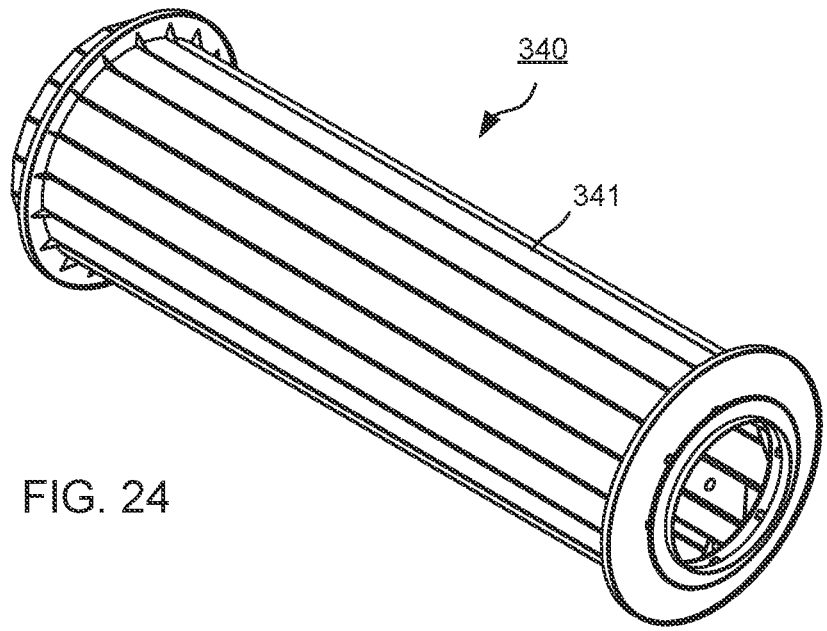
FIGS. 24-28 are various views of a drum or components thereof included in the conditioning system of the litter conditioner of FIG. 14.
Figure 25:
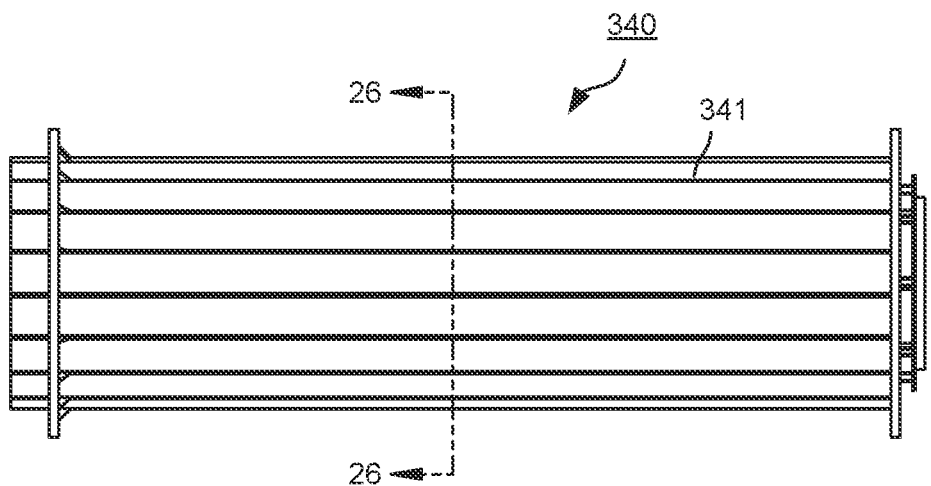
Figure 26:
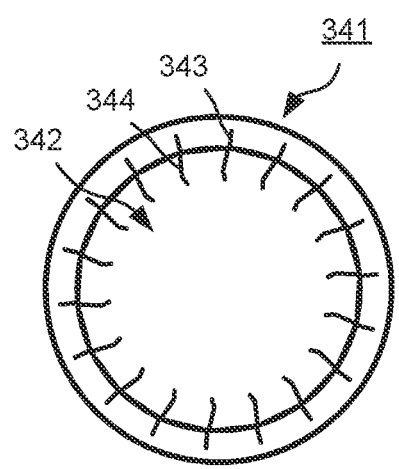

FIGS. 24-26 show the drum 341 of the conditioning system 340. The drum 341 defines an inner volume 342 configured to receive litter therein. The drum 341 is rotatable via a motor, engine, and/or the like. For example, in some embodiments, the drum 341 can be operably coupled to an output of the power unit 304 and rotated in response to rotation of the output of the power unit 304. In other embodiments, the drum 341 can be coupled to a separate and/or independent motor. The drum 341 can include any suitable internal feature, surface, structure, etc. configured to contact the litter disposed therein such that the rotation of the drum 341 tumbles the litter disposed in the inner volume 342 of the drum 341.

Figure 27:
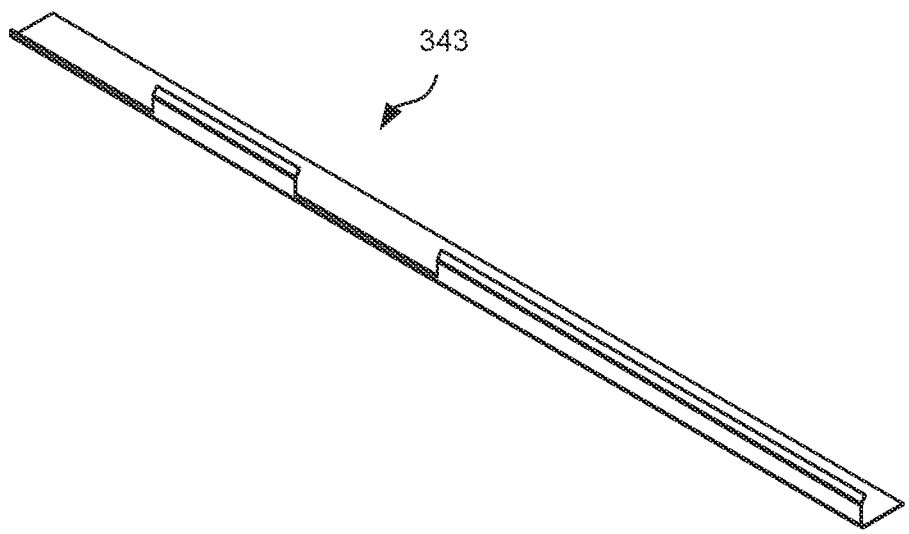
Figure 28:
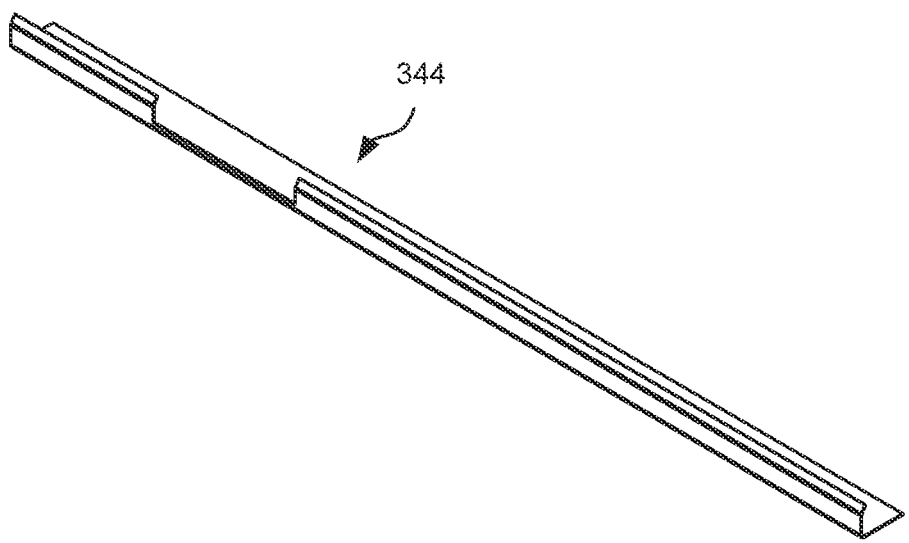

For example, FIGS. 27 and 28 are perspective views of a first flight 343 and a second flight 344, respectively. In some implementations, and inner portion or surface of the drum 341 can be formed by an alternating series of the flights 343 and 344. As shown in FIG. 26, the flights 343 and 344 can extend into the inner volume of the drum 341 and can form arms, flanges, ribs, protrusions, and/or the like that can toss and/or tumble the litter as the drum 341 is rotated. While particularly shown in FIGS. 26-28, in some implementations, the flights 343 and/or 344 can be modified to provide a desirable interaction with the litter disposed in the drum 341. For example, it may be desirable to increase or decrease the number of flights 343 and/or 344, enlarge a size of the flights 343 and/or 344 to hold a larger amount of litter, remove sections of the flights 343 and/or 344 to facilitate litter cycling, effective heat exchange, and/or litter tumbling, and/or the like.

The conditioning system 340 further includes the heating element disposed in the inner volume 342 of the drum 341 or disposed outside the drum 341 and otherwise configured to transfer thermal energy into the inner volume 342. The heating element can be, for example, any suitable element configured to release thermal energy. In some implementations, for example, the heating element can be a burner such as a propane burner, as described above with reference to the heating element 148 of the litter conditioner 100. In some embodiments, the heating element can be configured to receive, for example, a vaporized fuel (e.g., vaporized propane) from the fuel tank 306. In some embodiments, the conditioning system 340 can include a vaporizer 356 (see e.g., FIGS. 16, 17, and 19). The vaporizer 356 and/or the like is configured to vaporize the liquid propane received from the fuel tank 306 and to deliver the vaporized propane to the heating element, which can allow for a relatively high energy heating element while maintaining a size of the fuel tank 306 below a desired size threshold, as described above with reference to the litter conditioner 100.

In some implementations, the heating element can be configured to heat the litter to an average temperature associated with and/or otherwise resulting in a desired amount of conditioning. In some instances, a desired amount of conditioning can result in and/or can be associated with, for example, conditioned litter having average temperature of about 170° F. In some instances, the desired average temperature of the conditioned litter can be less than 170° F. In some instances, the desired average temperature of the conditioned litter can be at least 170° F. In some instances, the desired average temperature of the conditioned litter can be greater than 170° F.

In some instances, the desired amount of conditioning can be based on, for example, an amount, magnitude, and/or percentage of reduction in an ammonia level of the litter. For example, poultry manure is known to have relatively high levels of ammonia, which can be at least partially absorbed by the litter and can cause harm to the poultry if the litter is not treated, conditioned, dried, and/or replaced. In some instances, the desired amount of conditioning can be an amount of conditioning sufficient to reduce the ammonia levels in the litter and/or in the air of the animal enclosure below a predetermined threshold (e.g., as established by guidelines, and/or otherwise below which the ammonia levels do not harm the poultry and/or humans in the poultry house). In other instances, the desired amount of conditioning can be based on a percent reduction in the ammonia level (e.g., 30%, 20%, 30%, 40%, 50%, 60%, 70%, 80%, 90%, 99%, and/or 300% reduction). In still other instances, the desired amount of conditioning can be an amount of conditioning sufficient to kill microorganisms, pathogens, and/or the like contained in and/or carried by the litter.

In some implementations, one or more operating states of the conditioning system 340, the rotational velocity of the drum 341, an angle or tilt of the drum 341, an infeed flowrate of litter from the infeed mechanism 345 into the drum 341, an amount of thermal energy released by the heating element, and/or the like can be controlled and/or adjusted to increase or decrease a dwell time of the litter as it flows (and is tumbled) from the first end portion to the second end portion of the drum 341. For example, in some instances, the desired amount of conditioning can be based at least in part on an amount of thermal energy received from the heating element and an amount of time that the litter is exposed to the thermal energy. The configuration of the heating element is such that thermal energy is transferred to the gasses (e.g., air and/or other gasses) in the inner volume 342 of the drum 341 and thus, the amount of conditioning can be based at least in part on the dwell time of the litter in the inner volume 342 of the drum 341. Moreover, an inverse relationship can exist between the dwell time and the amount of thermal energy released by the heating element. As such, a flowrate of the litter through the drum 341 and/or an amount of thermal energy released by the heating element can be controlled and/or adjusted to result in a desired amount of conditioning of the litter.

In some implementations, the conditioning system 340 can include any number of sensors configured to sense at least one operating condition of the conditioning system 340. Data defined by the sensor(s) can be analyzed by, for example, the control system, which in turn, can determine and/or define one or more future states of the conditioning system 340 that will result in the desired amount of conditioning. In some instances, the future state can be the same as the current state (e.g., a steady state that does not call for a change in operating state). In other instances, the future state may be different from the current state and the control system may send to the conditioning system 340 one or more signals indicative of an instruction to change an operating condition of one or more portions of the conditioning system 340, thereby transitioning the conditioning system 340 to the future state. For example, in a first case, an amount of litter having a first ammonia level can be transferred into the drum 341 and conditioned for a first predetermined dwell time and/or at a first predetermined temperature based at least in part on the first ammonia level. In a second case, substantially the same amount of litter having a second ammonia level, less than the first ammonia level, can be transferred into the drum 341 and conditioned for a second predetermined dwell time and/or at a second predetermined temperature, where at least one of the second predetermined dwell time or the second predetermined temperature is less than the first predetermined dwell time or the first predetermined temperature, respectively. As such the control system can control one or more portions of the conditioning system 340 to provide a desired amount of litter conditioning.

Figure 29:
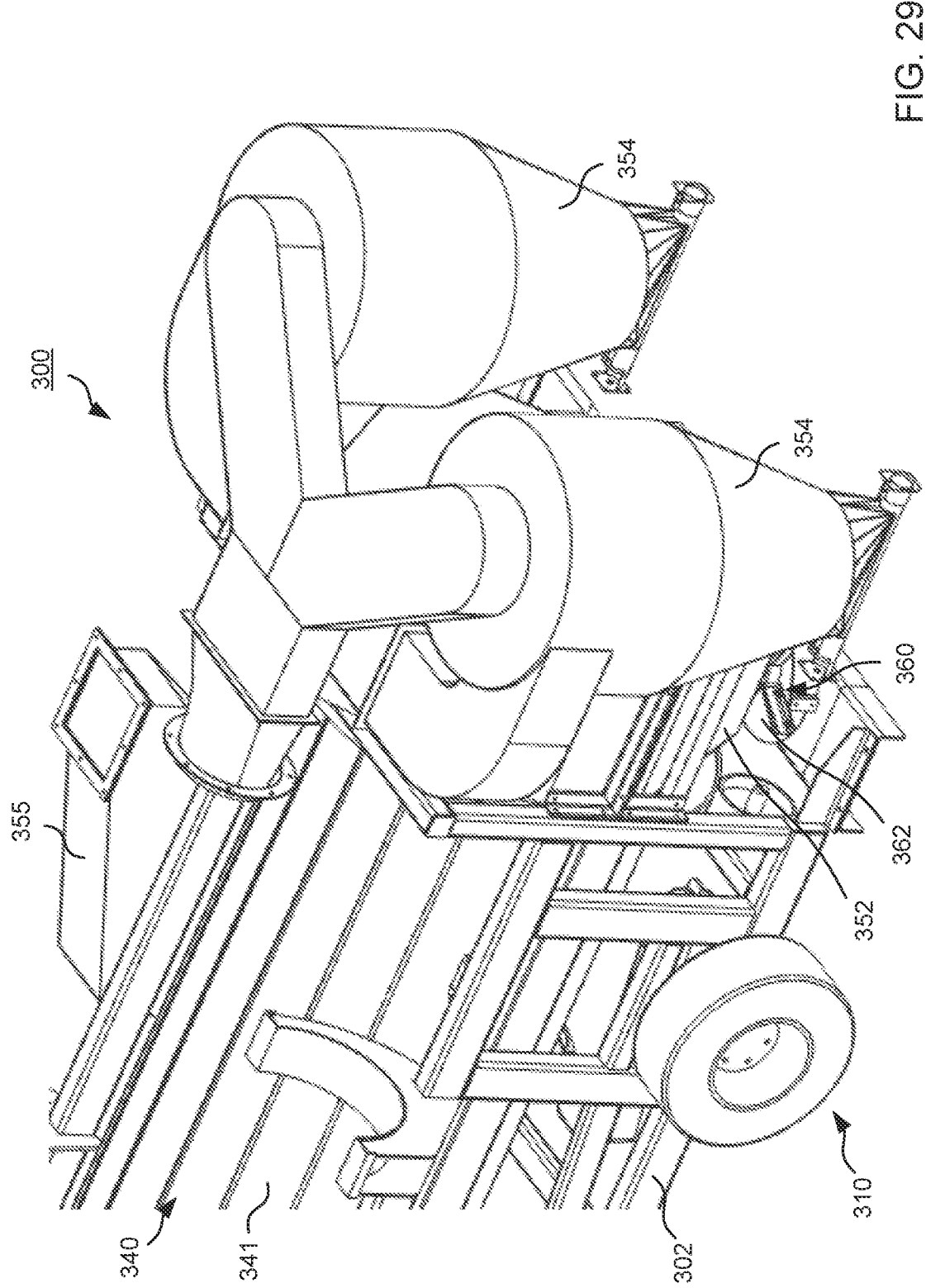
FIG. 29 is a rear perspective view illustration of at least a portion of the conditioning system and a dispersement system included in the litter conditioner of FIG. 14.

FIG. 29 shows the dispersement system 360 of the litter conditioner 300. The dispersement system 360 is coupled to the chassis 302 at a position near and/or adjacent to an output of the conditioning system 340 (e.g., at a rear end or portion of the chassis 302). The dispersement system 360 is configured to receive conditioned litter from the conditioning system 340 and to disperse the conditioned litter on to the floor (e.g., behind the litter conditioner 300). The dispersement system 360 can includes any suitable component, machine, device, motor, and/or the like that can aid in and/or otherwise facilitate the dispersement of the conditioned litter.

For example, the dispersement system 360 can include a blower 350 (FIGS. 14 and 15), an exhaust shroud 352, spreaders 362, separators 354, and an exhaust manifold 355. In some implementations, the blower 350, the separators 354, and the exhaust manifold 355 can be configured to separate dust from the conditioned litter, thereby reducing an amount of dust released into the air of the animal enclosure (e.g., poultry house). In some implementations, the exhaust manifold 355 can be configured to provide an outlet or exhaust opening configured to direct the dust toward, for example, the floor beneath the litter conditioner 300. In other implementations, the separators 354 can be configured to at least temporarily store the dust, which can be disposed of after a conditioning process (e.g., conditioning all the litter in an animal enclosure). In some embodiments, the separators 354 can be, for example, cyclone separators that receive a flow of air from the blower 350 and separate the dust from the conditioned litter based on, for example, density of the particles. In this manner, the dust particles can be transferred into the exhaust manifold 355 and directed toward the ground (or otherwise at least temporarily stored) and particles of conditioned litter can be transferred into the exhaust shroud 352 for dispersement via the spreaders 362.

The spreaders 362 can be any suitable device and/or mechanism configured to disperse the conditioned litter onto the floor. In some embodiments, for example, the spreaders 362 can be rotating disk spreaders 362 configured to spread a flow of conditioned litter onto the floor behind the litter conditioner. In other embodiments, the dispersement system 360 can include any suitable spreader, disperser, and/or output.

In some implementations, the dispersement system 360 can include any number of sensors configured to sense at least one operating condition of the dispersement system 360. Data defined by the sensor(s) can be analyzed by, for example, the control system, which in turn, can determine and/or define one or more operations to be performed by the dispersement system 360. For example, in some instances, one or more sensors can be configured to sense a flowrate of the conditioned litter provided to the spreaders 362. If, for example, the flowrate is below a predetermined threshold, the control system may determine that the separators 354 are full in not separating as desired, a speed or flowrate of air from the blower is too low, a flowrate of litter through the conditioning system 340 is below a desired threshold, a velocity of the litter conditioner along the floor is too fast, and/or the like. Conversely, if the flowrate is above a predetermined threshold, it may be desirable to reduce a flowrate of litter through the conditioning system 340 to ensure that the spreaders 362 are able to disperse or spread the conditioned litter in a desired manner.

As described above, the control system of the litter conditioner 300 can be configured to at least partially control the drive system 310, the collection system 320, the conditioning system 340, and/or the dispersement system 360 of the litter conditioner 300 to provide and/or perform at least semi-autonomous operation of the litter conditioner 300. Accordingly, the litter conditioner 300 can be used to collect used, clumped, caked, and/or saturated litter within an animal enclosure such as a poultry house, refresh and/or condition the used litter (e.g., via at least a heat treatment process), and to disperse conditioned litter back on the floor of the animal enclosure.

Figure 30:
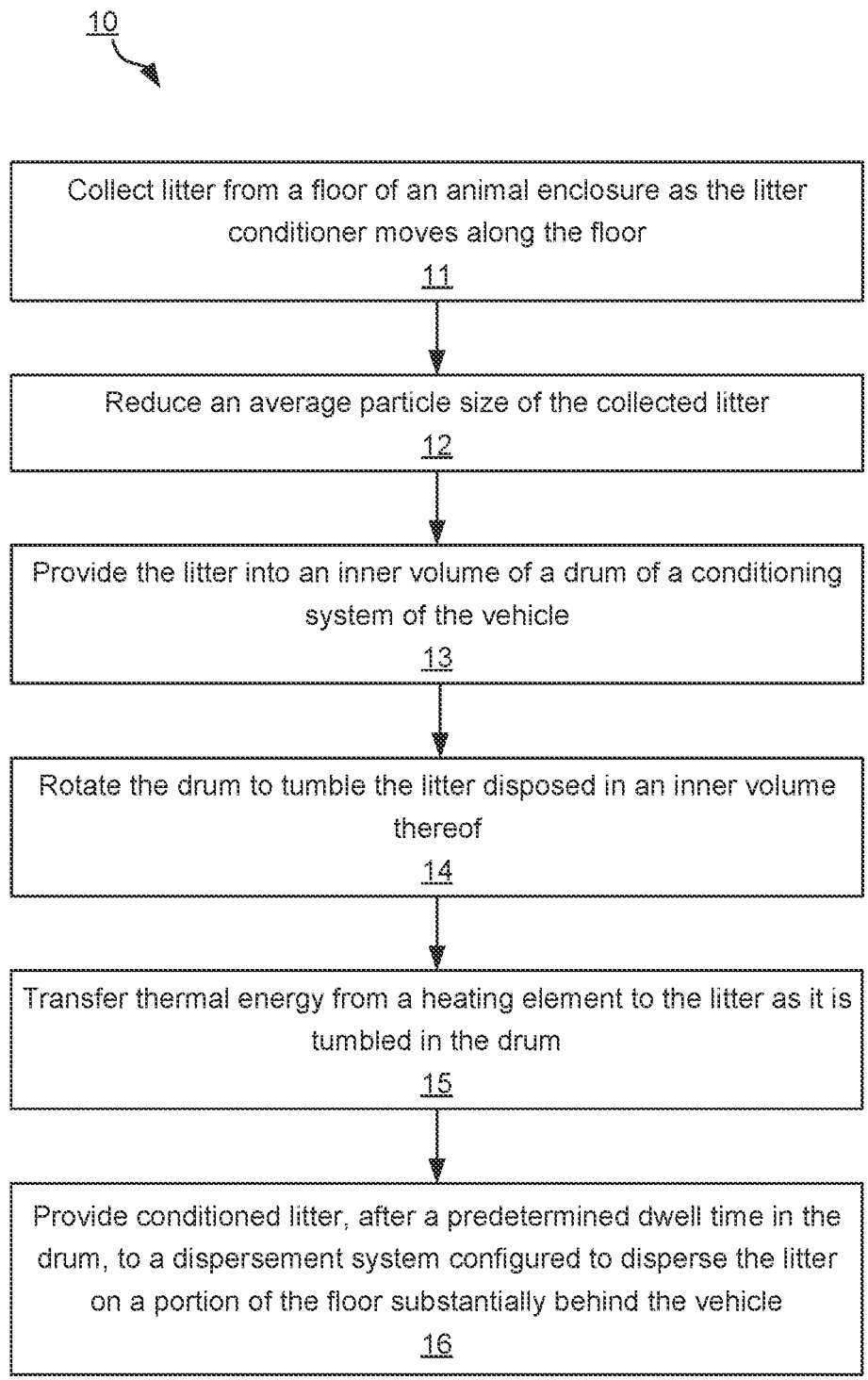
FIG. 30 is a flowchart illustrating a method of using an at least semi-autonomous litter conditioner according to an embodiment.

FIG. 30 is a flowchart illustrating a method 10 of using an at least semi-autonomous litter conditioning vehicle according to an embodiment. The litter conditioning vehicle (also referred to herein as the "litter conditioner") can be similar to or substantially the same as any of the litter conditioner 100, 200, and/or 300 described herein. For example, in some embodiments, the litter conditioner can include at least a collection system, a conditioning system, and a dispersement system. In some instances, the use of the litter conditioner can include at least partial control of the litter conditioner by a human operator. In other instances, the use of the litter conditioner can include remote control of the litter conditioner by a human operator. In still other instances, the use of the litter conditioner can include autonomous control of the litter conditioner substantially without human intervention and/or input.

In some implementations, the method 10 includes collecting litter from a floor of an animal enclosure as the litter conditioning vehicle moves along the floor, at 11. The litter conditioner, for example, can include a drive system that can be configured to move the litter conditioner along the floor, as described above with reference to the litter conditioners 100, 200, and/or 300. In some implementations, the litter conditioner can be at least temporarily coupled to a tractor or other vehicle that can tow or pull the litter conditioner along the floor. In some embodiments, the collection system of the litter conditioner collects the litter off of the floor as the litter conditioner is moved along the floor.

An average particle size of the collected litter is reduced, at 12. For example, in some embodiments, the collection system includes a flailer or the like that can break apart clumps, chunks, and/or cakes of litter as the litter is collected. The average particle size can be any suitable size, as described above with reference to the litter conditioners 100, 200, and/or 300. In some implementations, the collection system can provide the collected litter into an infeed mechanism, which in turn, can be configured to further reduce an average particle size of the collected litter, as described above with reference to the litter conditioner 300.

The litter is provided into an inner volume of a drum included in the conditioning system of the litter conditioner, at 13. For example, the infeed mechanism can include an infeed hopper that can receive a flow of litter from the collection system. In some implementations, an auger of the infeed mechanism can be configured to provide a flow of litter into the inner volume of the drum. As described above, in some implementations, the auger can further reduce an average particle size of the litter prior to providing the litter into the inner volume of the drum. In other implementations, the auger need not further reduce the average particle size. In some implementations, the collection system and/or the infeed mechanism of the conditioning system can be controlled to control and/or adjust a flowrate of litter into the inner volume of the drum to ensure the litter therein is conditioned to a desired level and/or conditioned a desired amount.

The drum is rotated to tumble the litter disposed in an inner volume of the drum, at 14. In addition, thermal energy is transferred from a heating element to the litter as the litter is tumbled in the inner volume of the drum, at 15. In other words, the litter disposed in the inner volume of the drum is conditioned and/or heat treated as the litter is tumbled in the inner volume of the drum. In some embodiments, the drum can include and/or suitable inner surface and/or feature configured to facilitate a flow of litter through the drum and/or an amount of thermal energy transferred to the litter as it flows through the drum, as described above with reference to the conditioning systems 140, 240, and/or 340. In some implementations, the amount of thermal energy transferred to the litter can be an amount sufficient to, for example, reduce an ammonia level within the litter or the air of the animal enclosure below a predetermined threshold ammonia level. In some implementations, the amount of the thermal energy transferred to the litter can be an amount sufficient to kill microorganism and/or pathogens in the litter. In some instances, for example, the amount of thermal energy can be an amount sufficient to raise an average temperature of the litter to at least 170° F.

After a predetermined dwell time in the drum, conditioned litter is provided from the drum to the dispersement system of the litter conditioner, which in turn, is configured to disperse the conditioned litter on a portion of the floor substantially behind the litter conditioner, at 16. For example, in some embodiments, the dispersement system can include one or more spreaders that receive a flow of conditioned litter from an outlet of the drum and spread the conditioned litter on the floor substantially behind the litter conditioner. In some implementations, the dispersement system includes a separation mechanism configured to at least partially separate dust particles from the conditioned litter, which can reduce an amount of dust released into the air of the animal enclosure. The separated dust can be, for example, released in a direction of the floor or can be at least temporarily collected and/or stored and disposed of after conditioning.

Accordingly, the litter conditioner 300 can be used to collect used, clumped, caked, and/or saturated litter within an animal enclosure such as a poultry house, refresh and/or condition the used litter (e.g., via at least a heat treatment process), and to disperse conditioned litter back on the floor of the animal enclosure.

Some embodiments described herein relate to a computer storage product with a non-transitory computer-readable medium (e.g., memories or one or more memories) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for a specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, ROM devices, RAM devices, and/or Programmable Logic Devices (PLDs). Other embodiments described herein relate to a computer program product, which can include, for example, the instructions and/or computer code discussed herein.

Some embodiments and/or methods described herein can be performed by software (executed on hardware), hardware, or a combination thereof. Hardware modules and/or components may include, for example, a general-purpose processor, a CPU, an FPGA, an ASIC, and/or the like. Software modules and/or instructions (executed on hardware) can be expressed in a variety of software languages (e.g., computer code), including C, C++, Java™, Ruby, Visual Basic™, Python™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools, and/or combinations thereof (e.g., Python™). Additional examples of computer code include, but are not limited to, control signals, encrypted code, and compressed code.

Some embodiments and/or methods described herein can include and/or can be performed by one or more control systems configured to perform and/or execute one or more processes included in and/or associated with at least semi-autonomous control of a litter conditioner and/or operation thereof. A control system can include any suitable component, device, and/or the like such as one or more sensors (e.g., encoders, position sensors, velocity sensors, acceleration sensors, proximity sensors, radar, lidar, optical sensors, pressure sensors, temperature sensors, and/or any other suitable sensor), electronic devices (e.g., computers), controllers (e.g., a PLD, a PLC, etc.), memories, processors, communication interfaces, user interfaces, and/or the like, as described above with reference to the control system 180. A control system can include any suitable combination of hardware-based, firmware-based, and/or software-based devices configured to receive, send, process, analyze, define, and/or store data such as, for example, data from one or more sensors, feedback data, historical data, profile data, statistical data, predictive data, and/or any other suitable data.

In some implementations, a control system can receive data associated with a current operating state of one or more systems of a litter conditioner; can determine and/or define a future operating state of the one or more systems based on the data; and can send any number of signals, instructions, electric power, etc. configured to transition the one or more systems from the current operating state to the future operating state (e.g., a new or updated operating state). In some implementations, a control system can define and/or provide graphic and/or digital representation(s) of data associated with one or more operating states of a litter conditioner; qualitative and/or quantitative results, characteristics, effectiveness, etc. associated with the litter conditioner or a litter conditioning process; litter characteristics and/or types; current, historical, profile, and/or predictive data, information, and/or reports associated with litter conditioning operations, plans, simulations, etc. for any number of animal enclosures (e.g., poultry houses); and/or any other suitable data associated with a litter conditioner, a conditioning process and/or operation, an animal enclosure, and/or the like. In some implementations, a control system can be configured to send one or more signals to and/or receive one or more signals from a remote electronic device such as a mobile device to allow for remote control and/or remote monitoring of a litter conditioner (e.g., via one or more networks). Accordingly, control systems and/or any of the components thereof described above can enable and/or allow for active user control of a litter conditioner, remote control of a litter conditioner, semi-autonomous control of a litter conditioner, and/or full or substantially full autonomous control of a litter conditioner.

While various embodiments have been described herein, textually and/or graphically, it should be understood that they have been presented by way of example only, and not limitation. Likewise, it should be understood that the specific terminology used herein is for the purpose of describing particular embodiments and/or features or components thereof and is not intended to be limiting. Various modifications, changes, enhancements, and/or variations in form and/or detail may be made without departing from the scope of the disclosure and/or without altering the function and/or advantages thereof unless expressly stated otherwise. Functionally equivalent embodiments, implementations, and/or methods, in addition to those enumerated herein, will be apparent to those skilled in the art from the foregoing descriptions and are intended to fall within the scope of the disclosure.

Where schematics, embodiments, and/or implementations described above indicate certain components arranged and/or configured in certain orientations or positions, the arrangement of components may be modified, adjusted, optimized, etc. The specific size and/or specific shape of the various components can be different from the embodiments shown and/or can be otherwise modified, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise.

Although various embodiments have been described as having particular characteristics, functions, components, elements, and/or features, other embodiments are possible having any combination and/or sub-combination of the characteristics, functions, components, elements, and/or features from any of the embodiments described herein, except mutually exclusive combinations or when clearly stated otherwise. Moreover, unless otherwise clearly indicated herein, any particular combination of components, functions, features, elements, etc. can be separated and/or segregated into independent components, functions, features, elements, etc. or can integrated into a single or unitary component, function, feature, element, etc.

Where methods described above indicate certain events occurring in certain order, the ordering of certain events may be modified. Additionally, certain of the events may be performed concurrently in a parallel process when possible, as well as performed sequentially as described above. While methods have been described as having particular steps and/or combinations of steps, other methods are possible having a combination of any steps from any of methods described herein, except mutually exclusive combinations and/or unless the context clearly states otherwise.

What is claimed:

1. A litter conditioning vehicle, comprising:
   a drive system coupled to a chassis and configured to move the litter conditioning vehicle along a floor of an animal enclosure;
   a collection system coupled to a front portion of the chassis, the collection system configured to collect litter from the floor and to reduce a particle size of the litter as it is collected;
   a conditioning system coupled along a length of the chassis, the conditioning system including a drum and a heating element, an inner volume of the drum configured to receive the litter collected by the collection system, the drum configured to rotate to tumble the litter disposed in the inner volume, the heating element configured to transfer thermal energy to the litter as the litter is tumbled in the drum;
   an exhaust system having an exhaust shroud coupled to an output end of the drum and configured to receive a flow of conditioned litter and exhaust heat from the conditioning system, the exhaust system having a blower configured to direct the exhaust heat through the exhaust shroud and toward the floor; and
   a dispersement system coupled to a back portion of the chassis, the dispersement system configured to receive conditioned litter from the conditioning system via the exhaust shroud and to disperse the conditioned litter on the floor behind the litter conditioning vehicle.

2. The litter conditioning vehicle of claim 1, wherein the heating element is configured to transfer thermal energy to the litter such that an average temperature of the litter is at least 170° F.

3. The litter conditioning vehicle of claim 1, further comprising:
   a control system including a plurality of sensors, the control system configured to control at least one of a flowrate of litter through the drum, an amount of thermal energy transferred to the litter in the drum, a dwell time of at least a portion of the litter in the drum, or a rotational velocity of the drum based at least in part on data received from at least one sensor from the plurality of sensors.

4. The litter conditioning vehicle of claim 1, wherein the collection system includes a flailer configured to reduce the particle size of the litter to a first average particle size, and
   the conditioning system includes an infeed mechanism, the infeed mechanism includes an auger configured to reduce the particle size of the litter from the first average particle size to a second average particle size, the infeed mechanism configured to deliver the litter having the second average particle size into the inner volume of the drum.

5. The litter conditioning vehicle of claim 4, wherein the second average particle size is between about 0.2 inches and about 1.0 inches.

6. The litter conditioning vehicle of claim 1, further comprising:
   a separator in communication with the blower and the exhaust shroud, the separator configured to separate dust from the flow of exhaust.

7. A litter conditioning vehicle, comprising:
a chassis;
a collection system coupled to a front portion of the chassis, the collection system configured to collect litter from a floor of an animal enclosure as the litter conditioning vehicle moves along the floor;
a conditioning system coupled along a length of the chassis, the conditioning system including an infeed mechanism, a drum, and a heating element, the infeed mechanism configured to receive the litter from the collection system and to provide the litter into an inner volume of the drum, the drum configured to rotate to tumble the litter disposed in the inner volume, the heating element configured to heat the litter as the litter is tumbled in the drum;
an exhaust system having an exhaust shroud coupled to an output end of the drum and configured to receive a flow of conditioned litter and exhaust heat from the conditioning system, the exhaust system having a blower configured to direct the exhaust heat through the exhaust shroud and toward the floor; and
a dispersement system coupled to a back portion of the chassis, the dispersement system configured to receive conditioned litter from the exhaust shroud and to disperse the conditioned litter on the floor behind the litter conditioning vehicle.

8. The litter conditioning vehicle of claim 7, wherein the heating element is configured to heat the litter to an average temperature of at least 170° F.

9. The litter conditioning vehicle of claim 7, wherein the collection system is configured to reduce a particle size of the litter to a first average particle size as the litter is collected from the floor, and
the infeed mechanism is configured to reduce the particle size of the litter from the first average particle size to a second average particle size and to provide the litter having the second average particle size into the inner volume of the drum.

10. The litter conditioning vehicle of claim 9, wherein the second average particle size is between about 0.2 inches and about 1.0 inches.

11. The litter conditioning vehicle of claim 7, further comprising:
a control system configured to control, without user intervention, at least one of a flowrate of litter through the drum, an amount of thermal energy transferred to the litter in the drum, a dwell time of at least a portion of the litter in the drum, or a rotational velocity of the drum based at least in part on the second average particle size.

12. The litter conditioning vehicle of claim 7, further comprising:
a separator in communication with the blower and the exhaust shroud, the separator configured to separate dust from the flow of exhaust.

13. A method of using a litter conditioning vehicle, the method comprising:
collecting litter from a floor of an animal enclosure via a collection system of the litter conditioning vehicle as the litter conditioning vehicle moves along the floor;
providing the litter into an inner volume of a drum included in a conditioning system of the litter conditioning vehicle;
rotating the drum to tumble the litter disposed in the inner volume of the drum;
transferring thermal energy from a heating element of the conditioning system to the litter as the litter is tumbled in the inner volume of the drum;
providing a flow of conditioned litter and exhaust heat from an output end of the drum and through at least a portion of an exhaust shroud of an exhaust system;
directing, via a blower of the exhaust system, the exhaust heat output by the conditioning system toward the floor; and
providing the conditioned litter from the exhaust shroud to a dispersement system, the dispersement system configured to disperse the conditioned litter on a portion of the floor substantially behind the litter conditioning vehicle.

14. The method of claim 13, wherein the transferring thermal energy from the heating element to the litter as the litter is tumbled in the inner volume of the drum includes transferring thermal energy to the litter such that an average temperature of the litter is at least 170° F.

15. The method of claim 13, the method further comprising:
reducing a particle size of the litter to a first average particle size as the litter is collected from the floor; and
reducing the particle size of the litter from the first average particle size litter to a second average particle size prior to providing the litter into the inner volume of the drum.

16. The method of claim 13, wherein the litter conditioning vehicle includes a control system and a drive system, the method further comprising:
receiving, from at least one sensor, data associated with at least one of an average particle size of the litter provided into the inner volume of the drum, an amount of thermal energy transferred from the heating element, a flowrate of the litter through the inner volume of the drum, or a rotational velocity of the drum;
defining, based at least in part on the data, at least one of a predetermined dwell time of at least a portion of the litter in the drum or an operating state of the drive system to move the litter conditioning vehicle along the floor at a predetermined velocity.

17. The method of claim 13, further comprising:
separating dust from the flow of conditioned litter and exhaust heat through the exhaust system.

* * * * *